(12) United States Patent
Poodeh et al.

(10) Patent No.: US 10,973,344 B2
(45) Date of Patent: *Apr. 13, 2021

(54) BEDDING SYSTEM WITH A CNN BASED MACHINE VISION PROCESS

(71) Applicant: XSENSOR Technology Corporation, Calgary (CA)

(72) Inventors: Omolbanin Yazdanbakhsh Poodeh, Calgary (CA); John Alexander Hogg, Calgary (CA); Ian Main, Calgary (CA)

(73) Assignee: XSENSOR Technology Corporation, Calgary (CA)

( * ) Notice: Subject to any disclaimer, the term of this patent is extended or adjusted under 35 U.S.C. 154(b) by 877 days.

This patent is subject to a terminal disclaimer.

(21) Appl. No.: 15/679,123

(22) Filed: Aug. 16, 2017

(65) Prior Publication Data

US 2018/0027988 A1 Feb. 1, 2018

Related U.S. Application Data

(63) Continuation-in-part of application No. 13/873,609, filed on Apr. 30, 2013, now Pat. No. 9,848,712.

(Continued)

(51) Int. Cl.
| | |
|---|---|
| *A47C 31/12* | (2006.01) |
| *G06N 3/04* | (2006.01) |
| *G06T 7/73* | (2017.01) |
| *A47C 27/08* | (2006.01) |
| *A47C 21/04* | (2006.01) |
| *A47C 21/00* | (2006.01) |
| *A47G 9/10* | (2006.01) |
| *A47C 31/00* | (2006.01) |

(Continued)

(52) U.S. Cl.
CPC .......... *A47C 31/123* (2013.01); *A47C 21/003* (2013.01); *A47C 21/044* (2013.01); *A47C 21/048* (2013.01); *A47C 27/083* (2013.01); *A47C 27/10* (2013.01); *A47C 31/008* (2013.01); *A47G 9/1027* (2013.01); *A47G 9/1036* (2013.01); *G06N 3/04* (2013.01); *G06N 3/08* (2013.01); *G06T 7/73* (2017.01); *G06T 2207/10016* (2013.01); *G06T 2207/20081* (2013.01); *G06T 2207/20084* (2013.01); *G06T 2207/30196* (2013.01)

(58) Field of Classification Search
None
See application file for complete search history.

(56) References Cited

U.S. PATENT DOCUMENTS 8,121,800 B2 * 2/2012 Altman ................... G01L 1/146
702/52
8,272,276 B2 * 9/2012 Gorjanc ................... G01L 1/146
73/862.046

(Continued)

*Primary Examiner* — Michael B Holmes
(74) *Attorney, Agent, or Firm* — Fenwick & West LLP

(57) ABSTRACT

A bedding system uses a convolutional neural network (CNN)-based machine vision to makes adjustments for comfort and/or support. The machine vision process identities a body position by using a trained CNN that receives a pressure image and identifies a body position. The body position may be determined by classifying the pressure image into a predetermined body position classification. The machine vision process includes at least one trained CNN that determines joint locations. The machine vision tracks pressure accumulated at joints over time.

17 Claims, 21 Drawing Sheets

Related U.S. Application Data

(60) Provisional application No. 61/640,648, filed on Apr. 30, 2012.

(51) Int. Cl.
*A47C 27/10* (2006.01)
*G06N 3/08* (2006.01)

(56) References Cited

U.S. PATENT DOCUMENTS

| | | | |
|---|---|---|---|
| 8,544,336 B2 * | 10/2013 | Main | G01L 1/146 73/724 |
| 8,893,561 B2 * | 11/2014 | Gorjanc | G01L 1/146 73/862.046 |
| 9,320,665 B2 * | 4/2016 | Main | A61B 5/447 |
| 9,659,322 B2 * | 5/2017 | Gorjanc | G06Q 30/0631 |
| 9,848,712 B2 * | 12/2017 | Main | A47C 27/10 |
| 9,860,982 B1 * | 1/2018 | Main | H05K 3/32 |
| 10,314,407 B1 * | 6/2019 | Main | A47C 27/083 |
| 10,562,412 B1 * | 2/2020 | Main | A61B 5/6893 |
| 10,729,876 B2 * | 8/2020 | Main | F24F 3/1603 |
| 2009/0093717 A1 * | 4/2009 | Carneiro | A61B 8/0866 600/443 |
| 2018/0064402 A1 * | 3/2018 | Leydon | A61B 5/0022 |
| 2019/0026957 A1 * | 1/2019 | Gausebeck | H04N 13/156 |

\* cited by examiner

| Sleep State | Support Layer | Comfort Layer | Temperature |
|---|---|---|---|
| Default | Stored Firmness | Stored Firmness | Stored Temp |
| Bed Entry | Decrease Firmness | Decrease Firmness | Increase |
| Deep Sleep | Stored Firmness | Stored Firmness | Decrease |
| Restless Motion | Decrease Firmness | Decrease Firmness | Increase |
| Morning Wake Up | Increase Firmness | Increase Firmness | Decrease |
| Bed Exit | Suspend Auto Adjust | Suspend Auto Adjust | Off |

Figure 10

Adjustable Pillow with Temperature control option.

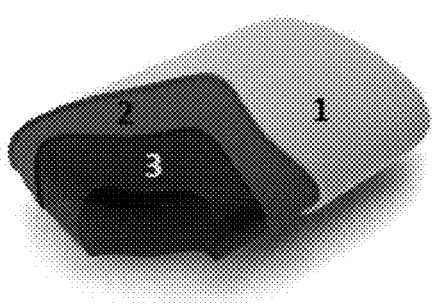

1 - Comfort Layer
- Reduces pressure points.
- Adjusted for personal preference.

2 - Temperature Layer (Optional)
- Heats or cools the pillow to sleep cycles and or personal preference.

3 - Support Layer
Adjusts height to keep spine (neck) in proper alignment.
- Options to include pressure map into pillow.
- Options to include temp control into pillow.

Figure 11a

Back Sleeper
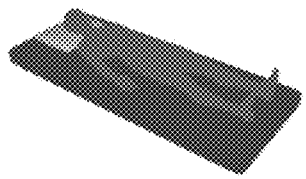
Back sleeping needs lower pillow.
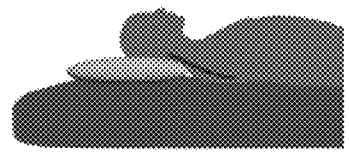
A high pillow will cause back sleepers discomfort due to poor spine alignment.
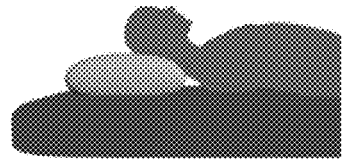
Side Sleeper
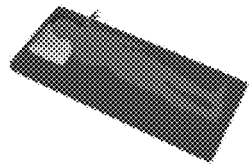
Side sleeping requires a higher pillow.
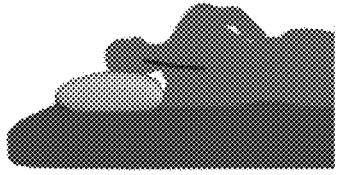
A low pillow will cause side sleepers discomfort due to poor spine alignment.
Figure 11b CA – Normalized Contact Area
APP – Normalized Average Peak Pressure

BEDDING SYSTEM WITH A CNN BASED MACHINE VISION PROCESS

CROSS-REFERENCE TO RELATED APPLICATIONS

This application is a continuation-in-part of and claims the benefit of U.S. application Ser. No. 13/873,609, "Bedding System with Support Surface Control", filed Apr. 30, 2013, which claims the benefit of U.S. Application No. 61/640,648, "Machine Vision for Support Surface Control," filed Apr. 30, 2012. The subject matter of each of the foregoing is incorporated herein by reference in its entirety.

BACKGROUND OF THE INVENTION

1. Field of the Invention

This invention relates generally to the monitoring and analysis of pressure data for the control of body support systems, including mattresses and other bedding systems.

2. Description of the Related Art

The performance of mattress and other bedding and body support systems depends in part on the amount of pressure and the distribution of pressure experienced by different parts of the body. Pressure mapping systems have been used to assess support surfaces and compare performance differences for different body types. Pressure mapping systems have also been used to design and test active bedding systems that are intended to minimize pressure across the body for medical and commercial applications. Pressure sensors have also been used to monitor bed pressure in order to reduce pressure where the bed contacts the body. However, simply reducing pressure on the body does not optimize the balance between comfort and support.

"Comfort" is commonly described as the way the surface of the mattress feels against the surface of your body. It can be a personal and subjective assessment of the mattress but there are mattress attributes that are known to impact this perception of comfort. The perception of comfort is primarily affected by the upholstery layers, particularly the cushioning and quilting. Mattress companies typically use words like "firm," "plush," and "pillow-top" to describe the comfort attributes of a bed, but this is simply a way of categorizing the softness or hardness of the surface layers. Other comfort-related attributes include features that minimize disturbance from your partner's movements, or that provide for differing levels of comfort on each side of the bed.

Comfort can be defined as a state of physical ease and freedom from pain or constraint. In the sleep industry, bedding systems are designed to provide maximum comfort by reducing pressure points on the body. For example, one manufacturer believes that pressures on the body must not exceed 0.5 pounds per square inch in order to maximize comfort. This pressure limit was chosen because it is generally accepted to be the point where blood circulation begins to be constricted and muscle tension begins to form. The end result of muscle tension and restricted blood flow is restless tossing and turning.

Bedding systems implement a wide variety of methods to reduce pressure points on the body. Latex or "memory foam," pocket coils, adjustable air beds, water beds, and pillow style "topper" layers are common technologies used to provide comfort by reducing pressure points. These systems work by increasing contact area and as a result the body pressure is distributed more evenly. However, there is a point where the redistribution of pressure via a softer bedding system can compromise the support of the mattress and this can result in back pain, feeling restricted and a less restful sleep.

"Support" commonly refers to the aspects of the bed that push back in order to hold your spine in position while you sleep. Unlike with comfort, which is largely a matter of personal preference, everyone requires some support from their mattress. Improper or inadequate support can result in tension or back pain, as your muscles try to compensate to keep your spine in alignment, and frequently causes pain and/or stiffness when you wake up. Though mattress companies use words like "firm" or "extra firm" to explain the support provided by a bed, what they are really describing is the extent to which the inner core of the mattress is "springy" or "stiff." The sleep surface should hold the spine as closely as possible to its natural alignment regardless if you are a back or side sleeper. However, the support requirements can be very different between side and back sleeping.

Bedding systems implement a wide variety of methods to provide support. Latex foam mattresses typically have a firmer inner layer to provide better support over the softer outer layer. In an innerspring mattress, support is driven primarily by the spring coils, both in their quantity and their construction. Pocket coils are known for providing exceptional support as they can provide varying and appropriate levels of support to different areas of the body, for example, head, chest, hips, or ankles. Air beds and water beds use fluid as the inner support layer and are fully customizable in terms of the firmness or support provided by the adjustable core.

Bedding system manufacturers typically offer a wide array of systems that provide varying degrees of firmness at both the outer layers (comfort layer) and the inner layers (support layer). This allows a customer to find a match for their body type and personal preferences.

However, support and comfort needs are known to change based on a person's body position or state of sleep. When buying a mattress it is common to be asked if you are a side sleeper or a back sleeper because the support requirements are usually very different between these positions. However, it is unnatural to spend all of your time sleeping in one position. Therefore, purchasing or configuring your bed to favour one position over another is a compromise at best.

Bedding systems that attempt to actively monitor pressure and make continuous adjustments typically rely on the process of trying to minimize pressure on all points of the body. However, focusing on minimizing pressure can lead to a bed surface that is too soft and provides inadequate support to ensure a restful and pain free sleep.

Therefore, there is a need for a bedding system that adjusts the support and comfort of the system in response to changing conditions.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. 10 is a table of sleep states with corresponding mattress adjustments.

FIG. 11a is an example of an adjustable pillow.

FIG. 11b illustrates spinal alignment for an adjustable pillow.

DETAILED DESCRIPTION OF THE PREFERRED EMBODIMENTS

Figure 1:
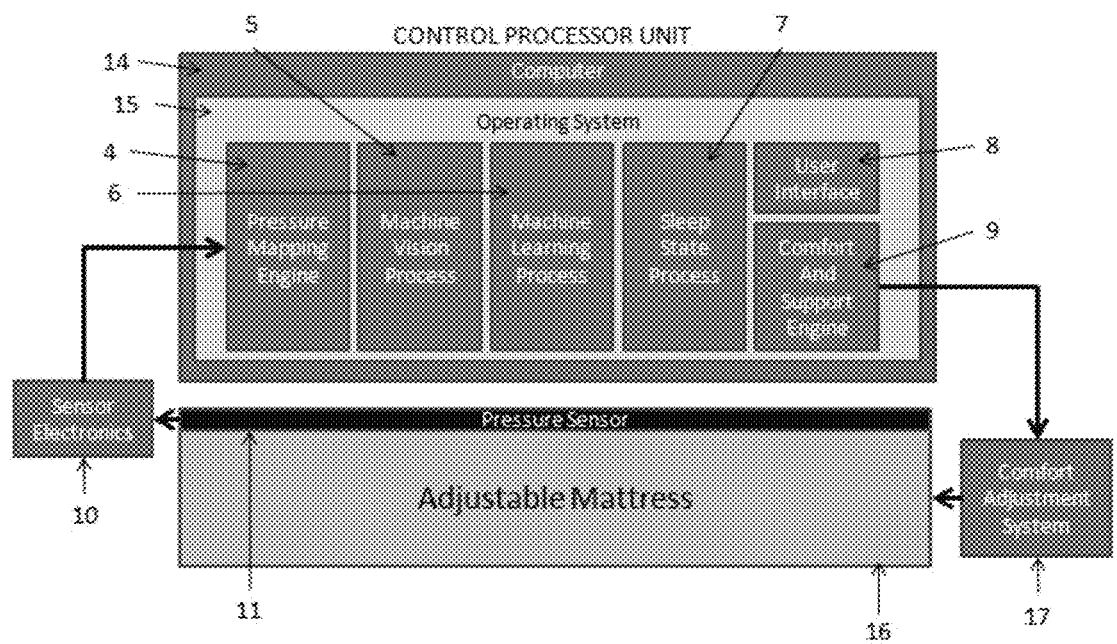
FIG. 1 is a diagram of a bedding system for comfort and support control.

Bedding system designers often use the attributes of hammockings, envelopment, and immersion to measure the support and comfort characteristics of a mattress. Hammocking refers to either lateral or longitudinal sag that is indicative of a system that is providing inadequate support and may be uncomfortable in the long term. Hammocking may be detected by elevated pressures around the edges of the body. Envelopment refers to how even the pressure is across the entire contact area. An extra firm mattress can have pressure peaks arounds the head, shoulders, hips, and heels. This uneven distribution of pressure is indicative of poor envelopment by the supporting surface and may result in both discomfort and poor spinal alignment. Immersion refers to the depth that the body sinks into the mattress or the difference between the unloaded surface height and the maximum penetration depth (indentation caused by the body). Immersion should be appropriate for a person's weight and body type in order to optimize envelopment while ensuring spinal alignment.

A pressure sensor measures the surface pressure distribution of a body supported by a surface, for example a person lying on a mattress or other bedding system. The pressure measurement data is analyzed to quantify comfort and support attributes such as hammocking, envelopment, and immersion. Contact area and peak pressure are examples of measurable parameters acquired from a pressure sensor that relate to a bedding system's comfort and support attributes.

In one implementation, the bedding system analyses pressure and contact area data in the current sleeping position and adjusts the firmness of the bedding system until the contact area and pressure distribution is optimized for comfort and support. Further adjustments can be done manually to accommodate personal preference. Alternately, the automatically determined firmness can be increased or decreased based on the person's sleep state.

In another aspect, a two person bedding system analyses pressure and contact area data independently for each person and adjusts firmness on each side of the bed to optimize comfort and support attributes for the size, weight, and sleeping position of each person. Further individual adjustments can be done manually to accommodate personal preference or the automatically determined firmness can be increased or decreased based on the person's sleep state.

In another aspect, the bedding system uses pressure information to locate body zones and determine sleep states in order to adjust localized attributes of support and comfort. These support and comfort attributes can include, for example, support layer firmness, comfort layer firmness, bed temperature, ambient noise and other environmental parameters. Support and comfort attributes can be localized to zones or areas of the body, for example, a head zone, a cocyx and ischial zone, and a heel zone.

In another aspect, a person's support and comfort requirements can change depending on a person's physiological or sleep state. For example, when a person first enters the bed, the bedding system may alter its support and comfort attributes in order to induce sleep. These same attributes may not provide the adequate environment to ensure a restful sleep throughout the night. Similarly, if a person becomes restless in the middle of the night, the bedding system can invoke a sleep inducing comfort to restore restful slumber. In another example, a bed's support and comfort attributes can be adjusted to inhibit sleep when it is time to get up in the morning.

FIG. 1 is a diagram of a bedding system with comfort and support control. The system shown in FIG. 1 includes the following major components: the bed sensor (11), the sensor electronics unit (10), the control processor unit (14), the comfort adjustment system (17), and the adjustable mattress or other adjustable bedding system (16). The control processor unit typically is a computer that includes software subcomponents including the operating system (15), the pressure mapping engine (4), the machine vision process (5), the machine learning process (6), the sleep state process (7), the comfort and support engine (9), and the user interface (8).

BED SENSOR. A bed pressure sensor (11) can come in various sizes to suit a wide range of standardized mattress sizes. The bedding system can support the acquisition of pressure data for a single person or the simultaneous acquisition of data for two people. For example, single person bed sensors typically have sensing areas ranging from 30"×74" to 54"×84", or preferably 32.5"×80", while two person bed sensors have sensing areas ranging from 60"×74" to 72"×84", or preferably 65"×80". Alternatively, two single person sensors can be used to acquire pressure data on a two person bedding system. Alternatively, smaller sensing areas can capture only important pressure point areas such as the body core, including hips, shoulders and lower back.

Each pressure sensor (11) contains an array of individual pressure sensing elements. Mattress sensor resolution is typically 0.5" to 2" pitch, or preferably 1.25" pitch. A sensel is an individual sensor within a sensor array. Single person bed sensor arrays are typically 16 sensels×40 sensels to 64 sensels×160 sensels, or preferably 26 sensels×64 sensels. Two person bed sensor arrays are typically 32 sensels×40 sensels to 128 sensels×160 sensels, or preferably 52 sensels× 64 sensels. The number of sensels required is dependent on the sensing area and the resolution of the sensor.

Bed pressure sensors (11) preferably are thin and flexible sensors that are designed to conform to the shape of the body of the person lying on the bed. They are typically covered with a light fabric, for example nylon taffeta, and may incorporate buckles, straps, or other methods of attaching the sensor to the adjustable mattress (16). Preferably, the sensor is mounted underneath a surface or quilt layer of the mattress.

Figure 2:
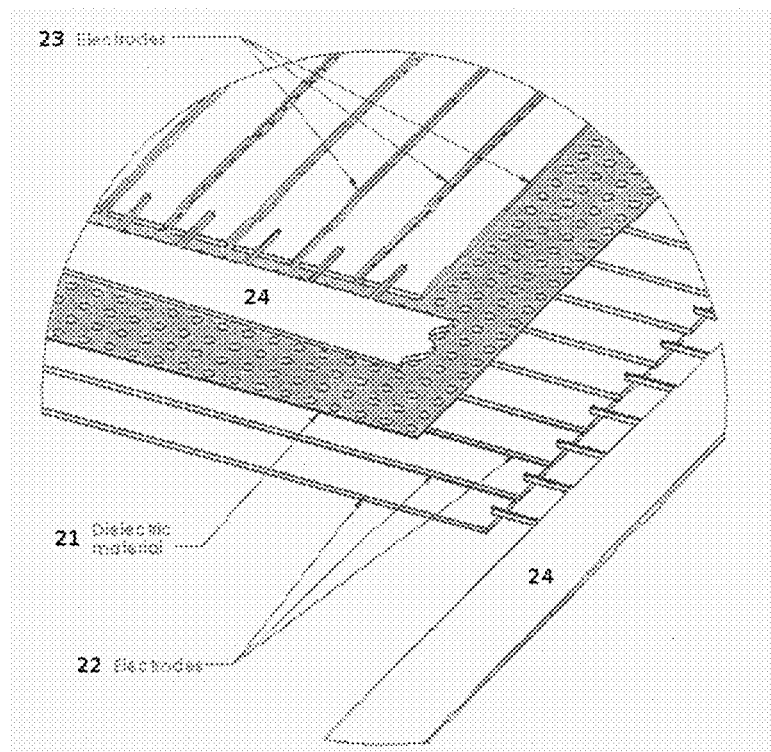
FIG. 2 is an exploded view of a capacitive pressure sensor.

Examples of bed pressure sensors include resistive pressure sensors, fibre-optic pressure sensors, or preferably capacitive pressure sensors. FIG. 2 illustrates the construction of an example capacitive pressure sensor. The sensor includes column electrodes (23) onto which a sinusoidal electrical signal is injected and row electrodes (22) where an attenuated sinusoidal signal is detected. The row and column electrodes are constructed of strips of electrically conductive material such as copper strips, aluminum strips, tin strips, or preferably conductive fabric or flexible circuit. The row and column electrodes are separated by a compressible dielectric material (21) such that the dielectric compresses according to the pressure applied to the surface of the sensor. An electrical signal is injected on a column electrode and is then attenuated as it passes through the dielectric material to the row electrode where the attenuated signal may be detected. The attenuation of the signal depends on the amount of mechanical dielectric compression resulting from the applied pressure. The detected signal can be measured by the sensor electronics and converted to a pressure value using a calibration process. The row and column electrodes are connected to the sensor electronics using a ribbon cable (24) or other electrically conductive wiring harness, for example, discrete wires, conductive fabric, printed circuit board, or preferably, a flexible circuit.

Figure 3:
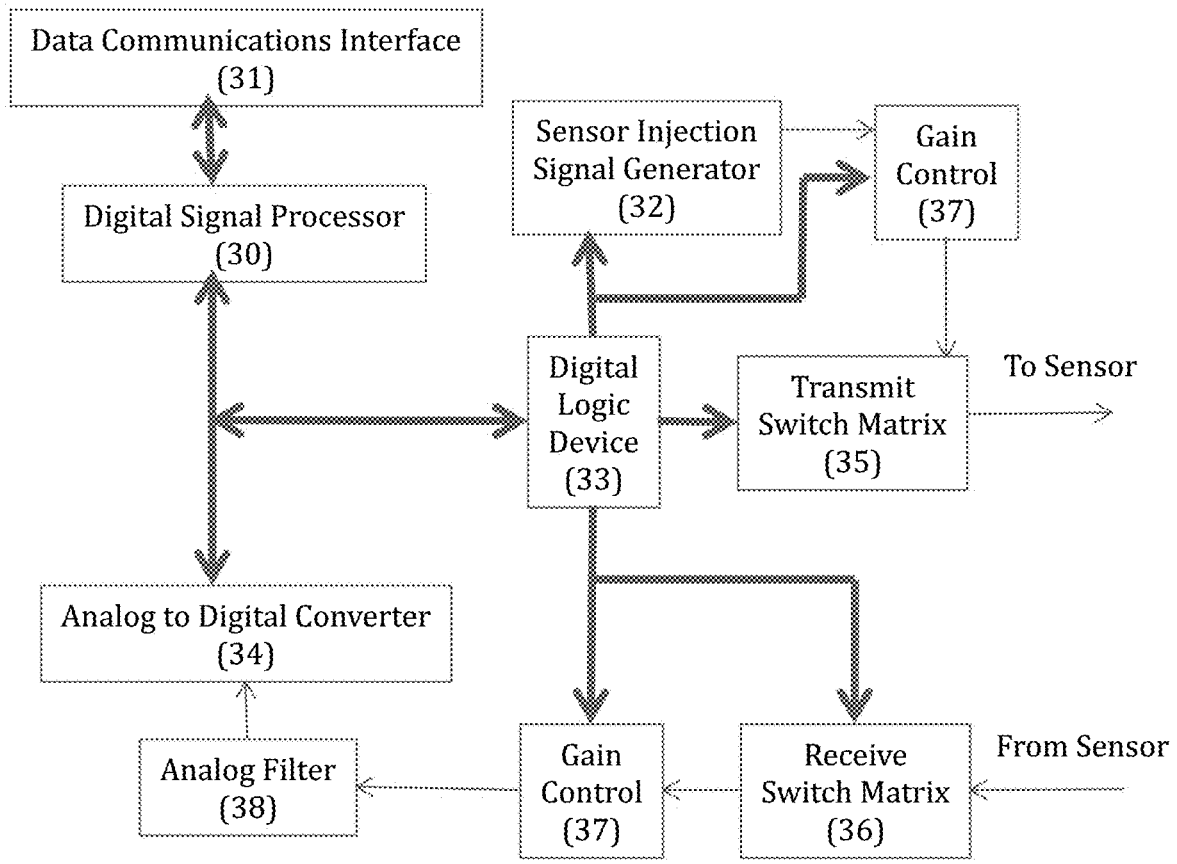
FIG. 3 is a block diagram of a sensor electronics unit.

SENSOR ELECTRONICS UNIT. An example sensor electronics unit shown in FIG. 3 includes a Digital Signal Processor (DSP) (30), injection signal generation and control (32), (37), (35), signal detection and control (36), (37), (38), (34), a digital logic device (33), and a data communications interface (31).

The DSP (30) executes firmware that is designed to receive control messages from application software running on a personal computer or embedded computer via the data communications interface (31). The control messages may include measurement requests that contain coordinates for an individual sensing element (sensel) within the pressure sensor array. The DSP (30) selects a column for the injection signal and a row for signal detection. The detected signal is then converted from analog to digital (34) for measurement processing by the DSP (30). The measurement is then passed back to the application software via the data communications interface (31).

The DSP (30) may be a standalone device or include external memory such as Random Access Memory (RAM), Read Only Memory (ROM), or any other commonly used memory device. Memory devices can be accessed either serially or via parallel data bus.

The sensor injection signal generation block (32) is an electronic device or circuit used to create a sinusoidal injection signal at a selectable frequency. The injection signal can be in the range of 1 kHz to 5 MHz, or preferably 1 kHz to 250 kHz.

The gain control block (37) is an electronic device or circuit used to adjust the amplitude of the injection signal. The gain setting is controlled by the DSP (30) via the digital logic device (33). The amplified injection signal is connected to the transmit switch matrix (35). The DSP (30) configures the digital logic device (33) to enable the appropriate switch in the switch matrix in order to select a sensor column for transmitting the injection signal.

The injection signal passes through the pressure sensor and is detected on a row selected using the receive switch matrix (36). The sensor row is selected by the DSP (30) via the digital logic device (33) and the selected signal is connected to the gain control block (37) for amplification.

An analog filter (38) removes signal noise before the analog to digital converter (ADC) (34). The analog filter is an electronic device or circuit that acts as a band pass or low pass filter and only passes frequencies near the injection signal frequency. For example, if the injection signal has a frequency of 250 kHz the filter only passes frequencies in the range of 200 kHz to 350 kHz and thereby rejects other interfering signals that are not within the pass band. The analog filter can be designed to accommodate pass bands of variable frequency spreads where tighter frequency spreads more effectively filter interfering signals.

The ADC (34) is periodically sampled by the DSP (30) in order to acquire sufficient samples for performing a measurement calculation. For example, 12, 24, 48, 96, or 192 samples can be acquired before performing a measurement calculation on the samples. The DSP (30) can also execute firmware to perform additional digital filtering in order to further reduce the frequency spread of the pass band and more effectively filter interfering signals. Digital filtering requires more samples from the ADC (34), for example in the range of 50 to 2500 samples, or preferably 512 samples.

The data communications interface (31) passes data between the DSP (30) and the application software running on the Control Processor Unit, see FIG. 1. The interface includes electronic devices or circuitry to perform wired or wireless communication. Examples of wired communication include RS232 serial, Universal Serial Bus (USB), Ethernet, fibre-optic, or any other serial or parallel data communication technology. Examples of wireless communication include, Zigbee, Bluetooth, WiFi, Wireless USB, or any other wireless data communication technology.

The digital logic device (33) includes electronic devices or circuitry, for example complex programmable logic devices (CPLD), field programmable gate arrays (FPGA), application specific integrated circuits (ASIC), or discrete logic devices. Alternatively, the DSP (30) has General Purpose Input Output (GPIO) pins that may be used in place of the digital logic device to control selectable electronic devices.

Figure 4:
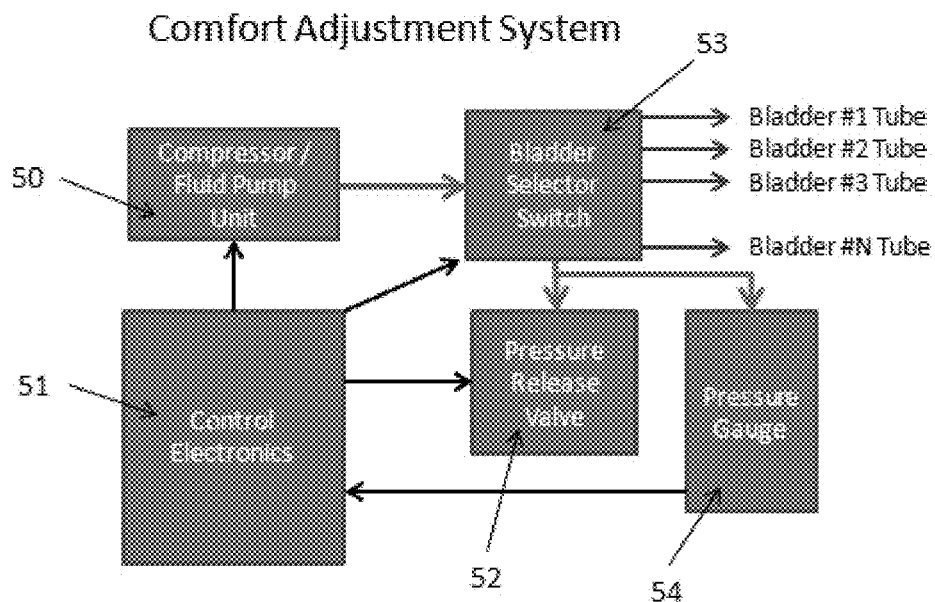
FIG. 4 is a block diagram of a comfort and support adjustment system.

COMFORT ADJUSTMENT SYSTEM. An example comfort adjustment system shown in FIG. 4 includes control electronics (51), a compressor or fluid pump unit (50), a bladder selector switch (53), a pressure relief valve (52), and a pressure gauge (54).

The control electronics (51) is a multi-channel digital-to-analog converter (DAC) and analog to digital converter (ADC) device that is used to control the inflation and deflation of the fluid bladders in the adjustable mattress. A serial communication channel between the control electronics (51) and the Control Processor Unit (14) is used to allow the CPU to monitor and control the inflation of the air bladders.

The compressor or fluid pump unit (50) is used to provide fluid to pressurize the bladders in the adjustable mattress. For example, a pump can be used to inflate fluid bladders in the adjustable mattress. The pump is activated whenever the pressure in a bladder is increased. Alternatively, a compressor unit can be used to store fluid at a higher pressure and this fluid is used to inflate the bladders. The compressor has the advantage of activating the pump less often and therefore the system will be quieter. For example, the pump can run during non sleeping hours to fill the compressor. The bedding system is then operated from the compressor throughout the night. The activation of the pump or compressor is controlled by the Control Processor Unit (14) via the control electronics (51).

The bladder selector switch (53) is used to select a specific bladder in the adjustable mattress for inflation. The bladder selector switch is not required if the bedding system only has a single bladder. The bladder selector switch is capable of injecting fluid via individual tubes into 1 to a maximum of 1664 fluid bladders, or preferably 5 to 350 bladders based on 3" diameter bladders arranged in an array over a single or two person bedding system. Bladder selection is controlled by the Control Processor Unit (14) via the control electronics (51).

The pressure release valve (52) is used to deflate bladders in the adjustable mattress. The Control Processor Unit (CPU) instructs the electronics unit (51) to first select the desired bladder using the bladder selector switch (53) and then activates the pressure release valve to decrease the pressure in the selected bladder. The electronics unit simultaneously disables the compressor or fluid pump unit (50).

The pressure gauge (54) is used to measure the pressure in the adjustable mattress bladders. The Control Processor Unit (14) periodically samples each bladder via the electronics unit (51) in order to monitor inflation. For example, the Control Processor Unit (CPU) adjusts the inflation in a particular fluid bladder until the desired pressure measurement is obtained for the bladder being adjusted. The Control Processor Unit (14) then samples the pressure gauge for that bladder and stores this information for future reference.

ADJUSTABLE MATTRESS. An example adjustable mattress shown in FIG. 5 includes a surface layer (40), a comfort layer (41), a support layer (42), and a base layer (43). The surface layer (40) is simply a cover material, quilt layer, or thin comfort layer consisting of down or synthetic "pillow top" pockets or a soft latex foam. The surface layer (40) is 1" thick, or less. The comfort layer (41) consists of common bedding materials such as latex, memory foam, polyurethane foam, natural and/or artificial fibers, microcoils, or buckling column gel. The comfort layer may also include an adjustable fluid bladder system underneath the common comfort layer bedding materials, such that the firmness of the comfort layer can be adjusted. The comfort layer can range between 1" and 6" thick, or preferably 3" thick. The support layer (42) is the core of the mattress and consists of common bedding materials such as latex foam, polyurethane foam, innersprings or pocket coils, or preferably an adjustable fluid bladder system. The support layer (42) can range between 3" and 24" thick, or preferably 4" to 6" thick. The base layer (43) consists of latex or polyurethane foam. It serves as a protective layer for the core support layer and ranges between 1" to 2" thick. The firmness of the adjustable fluid bladder layer is determined by the Comfort Adjustment System in FIG. 4.

Figures 5, 6:
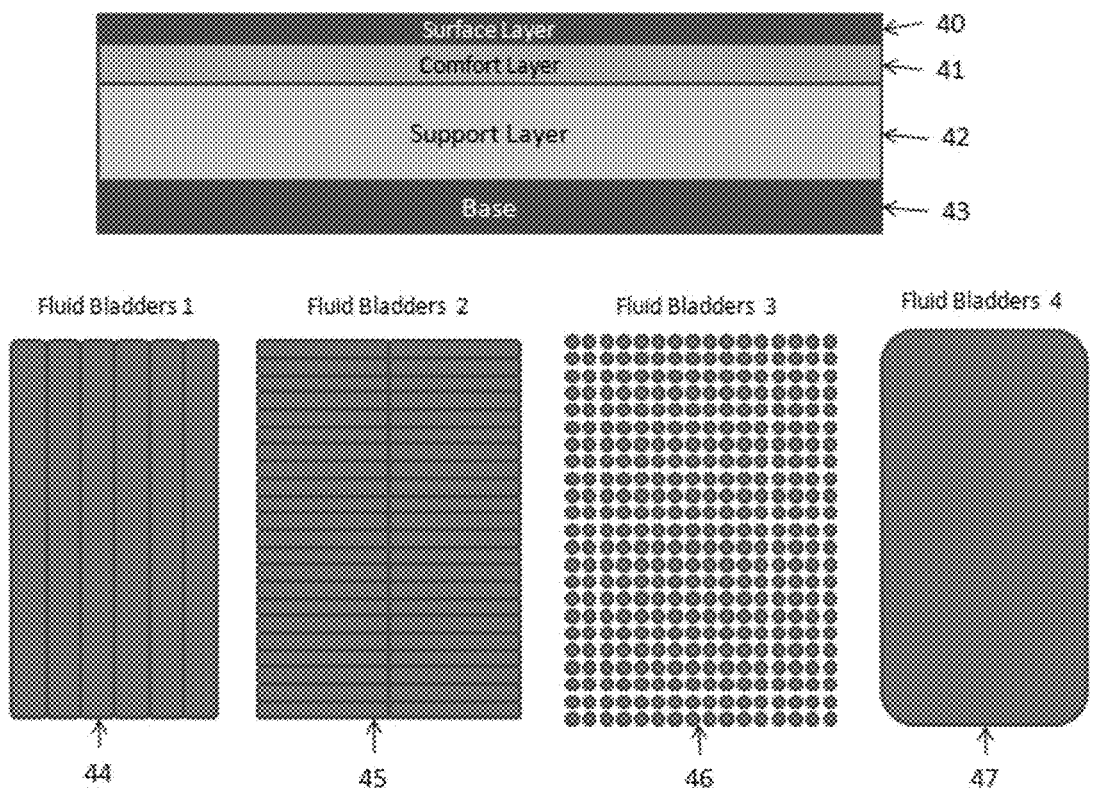
FIG. 5 shows examples of adjustable mattress systems.
FIG. 6 is a table of standard mattress sizes.

The adjustable fluid bladder layer can be a single bladder (47), multiple longitudinal bladders (44), multiple lateral bladders (45), or an array of cylindrical bladders or cells (46). The cylindrical bladders may also be oval or rectangular in shape to reduce the number of cells. The bladder systems vary in size to fit the industry standard bed sizes as shown in FIG. 6. Two person bed sizes, king size for example, will consist of two equally sized single bladders (47), two equally sized columns of lateral bladders (45), or wider versions of the longitudinal (44) or cylindrical array (46) bladders. The longitudinal fluid bladders (44) range in size from 1" to 12" wide with a length that is appropriate for the mattress size. The lateral fluid bladders (45) range in size from 1" to 12" wide with a length that is appropriate for the mattress size. The cylindrical bladders (46) range in size from 1" diameter to 6" diameter.

APPLICATION SOFTWARE. In this example, the bedding system application software runs on a standard embedded computer device (14), for example, an Intel processor based module equipped with Universal Serial Bus ports and WiFi and Bluetooth wireless capability.

The application software runs with a standard computer or embedded operating system (OS) (15) such as Linux, embedded Linux, NetBSD, WindowsCE, Windows 7 or 8 embedded, Mac OS, iOS, Android, QNX, or preferably, Windows 8.

Figure 7:
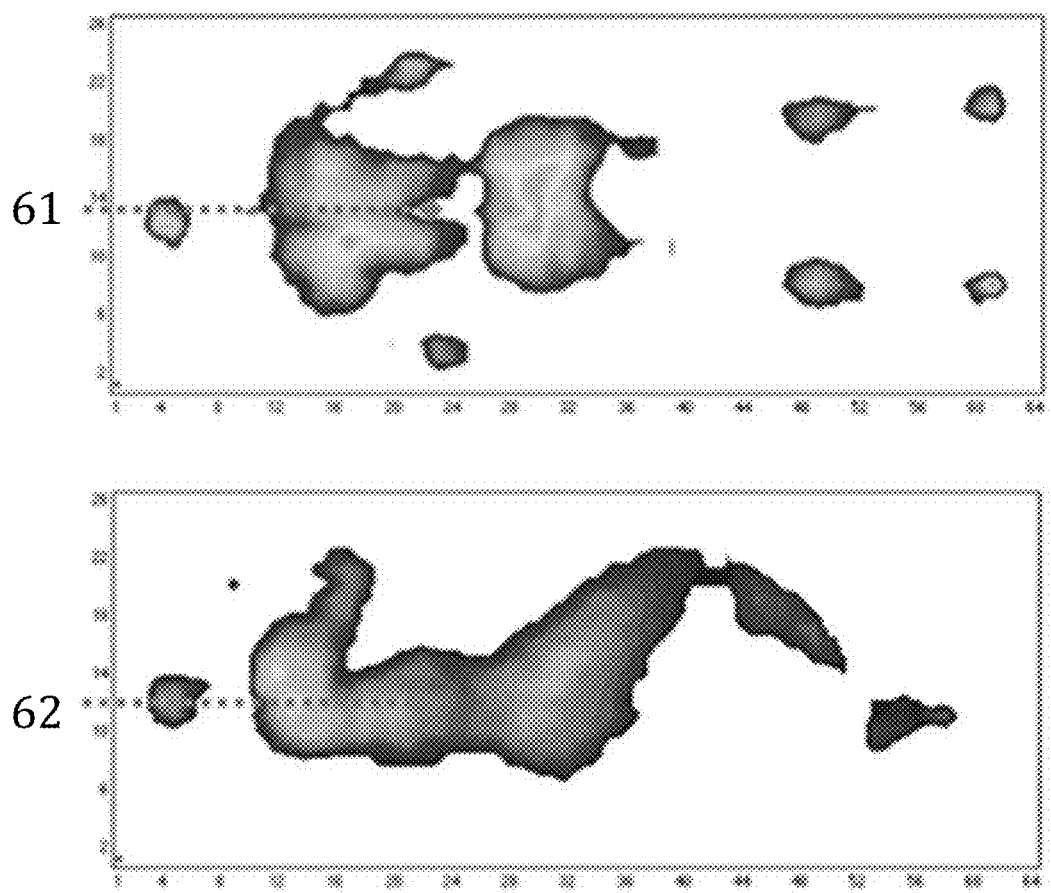
FIG. 7 is a representative image of pressure sensor data.

The pressure mapping engine software performs basic functionality such as data messaging with the sensor electronics (10), conversion of measurements from the sensor electronics (10) to calibrated pressure values, and organization of data into an array of measurements representative of the sensor array. The pressure mapping engine can also operate in a non-calibrated mode where raw pressure sensor measurements are compared and processed relative to other raw pressure sensor measurements and absolute pressure values are not calculated. An example of an array of pressure measurements shown in FIG. 7, includes a two-dimensional pressure image of a person lying on their back (61) and a two-dimensional pressure image of a person lying on their side (62). This is a graphical representation of the measurement information that is generated and stored by the pressure mapping engine. Areas of low pressure measurements are shown in darker shades or colours.

The pressure mapping engine software calculates a number of parameters that are derived from the pressure image. For example, contact area can be calculated for the entire pressure sensing area. Contact area is based on the number of sensels with measured pressure above a minimum threshold.

In another example, average peak pressure can be calculated over the entire pressure sensing area. In one approach, average peak pressure is calculated by isolating a group of sensels with the highest measured pressures (the peak pressures), then averaging those pressure values to obtain the result. A sensel is an individual sensing element within the sensor array. For example, using a bed sensor with 1664 sensels in the sensor area, the 16 sensels with the highest pressure measurements could be averaged to determine the average peak pressure. The number of sensels averaged could be 25% to 0.5%, or preferably 1%, of the total number of sensels in the array. The number of sensels averaged could also be 25% to 0.5%, or preferably 1%, of the total number of sensels in the array that are above a pressure threshold, for example, 10 mmHg. The average peak pressure algorithm may also reject peak pressures to reduce the impact of creases in the sensor, objects in the customer's pockets, or hard edges in the customer's clothing. For example, the one to ten, or preferably three, highest pressure measurements can be excluded from the average peak pressure calculation.

Other pressure related parameters can also be calculated from the sensor data. For example, a load calculation could be used to estimate the person's weight. The person's height can be estimated by adding the number of sensels above a minimum pressure from the person's head to their toes, when they are lying on their back. Shear force can also be estimated based on the pressure gradient between sensels. In another example, pressure data can be used to analyze the distribution of pressure over the entire sensing area.

The pressure data and related metrics are then further processed by the machine vision (5), machine learning (6), and sleep state (7), and comfort and support (9) software applications.

The machine vision process (5) analyzes pressure data to identify body types and to identify body position. For example, when a person first lies on a two person mattress the machine vision process analyzes the two-dimensional pressure image of the sleeper and derives a physical profile. The physical profile is matched to the two physical profiles stored during the set up process of the bedding system. The machine vision process determines the identity of the person entering the bed and passes this information to the comfort and support engine (9). The bedding system can then be configured appropriately for that person.

A "physical profile" is at least one physical attribute of individuals which can be derived from the pressure sensor dataset acquired from a reference mattress. The physical profile may include attributes such as measurements of certain body features, for example, height, weight, shoulder-width, hip-width or waist-width; or ratios of these measurements, for example, shoulder to hip ratio, shoulder to waist ratio, or waist to hip ratio; body type, for example endomorph, ectomorph, endomorph; or Body Mass Index (BMI).

In another example, a peak pressure curve is created along the length of a person lying on their back or side. Mass distribution requires calculation of a mass based on applied pressure over a given unit area. For example, a mass can be calculated for each individual sensel in the sensing array by multiplying the measured pressure by the area of the sensel. Mass can also be calculated for larger areas by averaging pressure measurements over a group of sensels, for example 2×2 or 4×4 sensels. A body mass curve can also be created along the length of a person lying on their back or side. A peak pressure curve and/or a body mass curve can also be used for matching a body profile.

The machine vision process (5) continuously monitors and processes the pressure data to determine a person's body position. For example, position classifications can include "on back," "left side," or "right side." The body position is passed to the comfort and support engine (9) and the bedding system is configured appropriately for the person's body position.

Details of an example machine vision process are provided in U.S. Application No. 61/640,648, "Machine Vision for Support Surface Control," filed Apr. 30, 2012, which is incorporated by reference herein.

The machine learning process (6) uses the pressure data to detect changes in pressure that indicate movement or restlessness. For example, if the pressure sensels above a minimum pressure threshold show little variation over a period of time, then the person can be considered as motionless. A variation threshold of 10% to 100%, or preferably 25% of the measured pressure can be used to determine if there is movement on a particular sensel or group of sensels. The machine learning process tracks periods of stillness and movement to create a person's sleep profile for the night. Major position changes are detected by the machine vision process (5) and these can also be tracked to determine if a person has been tossing and turning throughout the night.

When the machine learning process (6) detects a restless state then this information is passed to the comfort and support engine (9) where the bedding system comfort and support attributes are adjusted to help induce a deeper, more restful, sleep.

Figure 8:
FIG. 8 is an example of a machine learning user interface.

The user interface (8) can also solicit feedback on a person's sleep after they have awakened in the morning. An example of a sleep feedback interface is provided in FIG. 8 where the person ranks comfort, back pain, quality of sleep, stiffness, and feeling of tiredness on a scale of 1 to 5. The machine learning process (6) uses this feedback information to assess the success of support and comfort attribute adjustments that were made throughout the night. Support and comfort attributes that show a statistical improvement in sleep quality will be implemented more frequently to improve overall sleep quality.

The sleep state process (7) uses pressure data and data from the machine vision process (5) and the machine learning process (6) to assess the state of a person's sleep. For example, bed entry can be detected when the pressure data changes from no pressure to a pressure indicating that there is a person on the bed. The "bed empty" state is detected when a threshold number of sensels are below a threshold pressure value. For example, if 100% to 90%, or preferably 98% of sensels measure pressure below 1 mmHg to 20 mmHg, or preferably 5 mmHg, then the sleep state is "bed empty." A transition from the "bed empty" state to "bed entry" state indicates that a person has gotten into bed.

Figure 9:
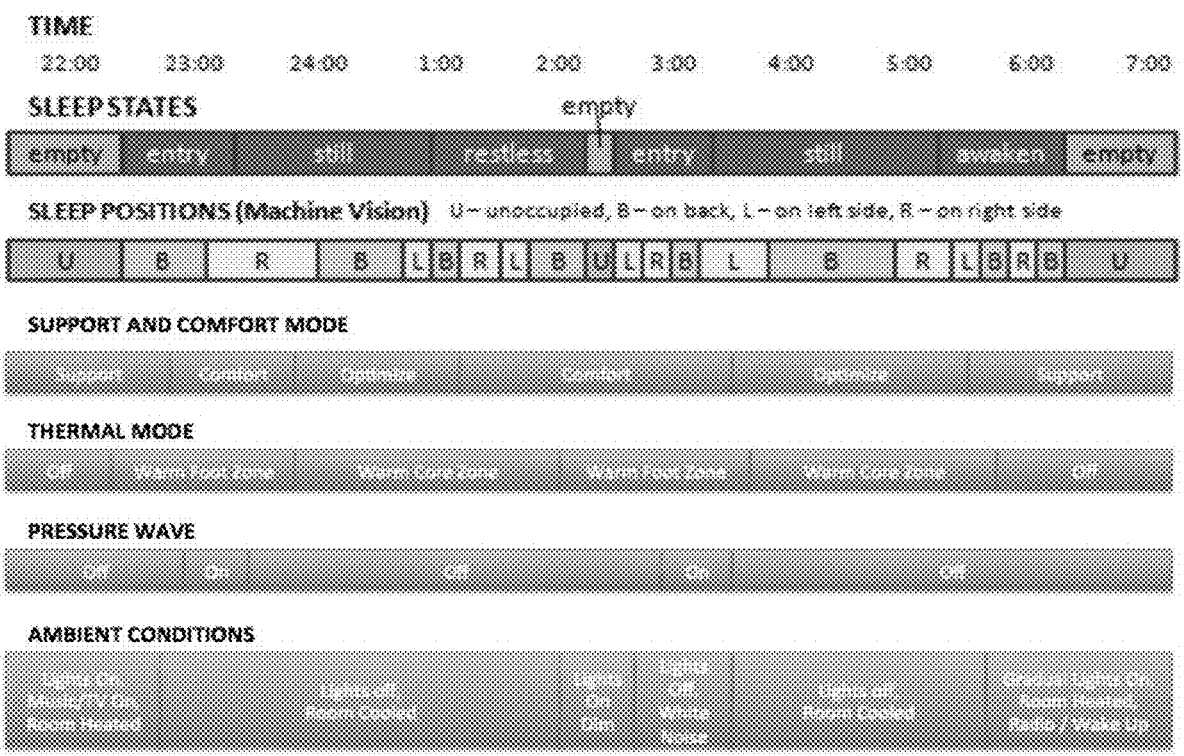
FIG. 9 is an example of a sleep state sequence.

An example of a sleep state sequence in FIG. 9 shows a person transitioning between "bed entry," "still", and "restless" states with corresponding body positions determined by the machine vision process (5). The sleep state information is passed to the comfort and support engine (9) that initiates adjustments to the support and comfort attributes of the adjustable mattress. For example, in the "bed entry" and "restless" states, the amount of support can be reduced and comfort increased to induce sleep. Support can be compromised in favor of comfort until a restful sleep is restored. In the "still" state, support is increased even if it results in a reduction in comfort. This is to ensure the best spinal alignment during deep sleep. In the "awaken" state, the support and comfort attributes can be adjusted such that sleep is inhibited, for example, the adjustable mattress can be made extra firm.

The sleep state process (7) can utilize pressure data or other sensors to detect the accepted standard 5 stages of sleep: stage 1, transition stage between sleeping and waking where the brain produces high amplitude theta waves; stage 2, the body prepares to enter deeper sleep where brain waves become slower and bursts of rapid, rhythmic brain wave activity known as sleep spindles occur, body temperature starts to decrease and heart rate begins to slow; stage 3, transitional state between light and deep sleep, slow brain waves known as delta waves begin to occur; stage 4, deep sleep where delta waves occur; stage 5, Rapid Eye Movement (REM) sleep, characterized by eye movement, increased respiration and increased brain activity. Micro changes in pressure can be analyzed to detect changes in respiration or a brain wave sensing headband could be worn to detect the beta, alpha, theta and delta waves associated with the 5 stages of sleep.

Sleep state or sleep stage information can be passed to the machine learning process (6) to compare the night's sleep to previous or average patterns recorded. This information can be used to assess the performance of the support and comfort attribute adjustments implemented through the night.

The comfort and support engine (9) uses inputs from the pressure mapping engine (4), the machine vision process (5), the machine learning process (6), and the sleep state process (7) to select or adjust support and comfort attributes of the adjustable mattress. The comfort and support engine calculates the desired settings for each of the bladders in the support and comfort layers of the adjustable mattress (16) and communicates with the comfort adjustment system (17) to implement these settings. The comfort and support engine (9) uses the inputs from the other software applications to automatically determine the most appropriate adjustable mattress settings. A manual process can also be used to derive or adjust the settings. An example in FIG. 10 lists sleep state related adjustments to the comfort and support layers of the adjustable mattress (16).

USER INTERFACE DEVICE. The Control Processor Unit can be manually controlled with a user interface device. The user interface device can be a built in touch panel computer or a simple handheld input device. The Control Processor Unit can also connect wirelessly to an external user interface device such as a laptop computer, tablet computer, or smart phone device. The pressure sensor (11) may also be used as an input device where settings are made using gestures. For example, tracing an "L" shape anywhere on the sensor will lower the firmness of the mattress by a predetermined amount.

ACCESSORY DEVICES. The Control Processor Unit can have additional input output control for monitoring and controlling accessory devices that affect comfort attributes. Accessory devices include temperature control devices, temperature sensors, white noise generators, audio sensors, biofeedback sensors, lighting controls, and light sensors. Communication and control of the accessory devices can be performed via the Universal Serial Bus (USB) port, Firewire port, or via Bluetooth or WiFi wireless connections.

The bedding system can include a thermal control device that regulates temperature on the mattress surface. The temperature can be elevated to increase comfort and induce sleep or it can be lowered slightly to promote sound sleeping. The temperature can be further lowered to promote awakening. The temperature can be controlled via a single or multiple "zoned" thermal pad using, for example, either electrical heating elements or flexible fluid thermal coils where fluid is heated or cooled by an external unit. An external thermal controller unit can provide heating and cooling of the fluid as well as control the circulation of the fluid through the bedding system. The thermal pads can be installed under the surface layer of the mattress, embedded in the comfort or support layer, or incorporated into a blanket or other bed covering.

The thermal control device can contain the electronics, pumps, and power supplies required to operate. External control from the comfort and support engine (9) is provided via USB or wireless communication interfaces. Alternatively, the Control Processor Unit can provide general purpose input and output signals to control switches and relays within the thermal control device.

The bedding system can provide a low air loss layer or overlay that provides microclimate control by reducing pressure across one or multiple zones and providing continuous air flow at the bed surface. The low rate airflow helps to control humidity and moisture. Moisture or temperature sensors may also be incorporated in the bedding system to determine when a person is getting too warm or perspiring too much. The rate of airflow can then be adjusted to provide maximum comfort over a wide range of environmental conditions.

The bedding system can include temperature sensors that can be used to monitor body temperature and detect changes in sleep state. The temperature sensors in conjunction with the temperature control device can regulate body temperature in response to changing environmental and physiological conditions throughout the night. Temperature sensors in the bedding system can track core body temperatures and the legs, arms, hands, and feet to determine a person's sleep state.

The bedding system can provide zone specific heating and cooling that will create sleep or wakefulness inducing conditions. Proximal skin warming (hands and feet) suppresses wakefulness and distal skin warming (torso and legs) enhances wakefulness. The machine vision process (5) in conjunction with the sleep state process (7) can locate the distal and proximal body zones and warm or cool these areas slightly to induce sleep or wakefulness. For example, when a person first enters the bedding system the thermal pads can be activated to slightly warm the hands and feet, or preferably feet only. During the "awaken" state the thermal pads around the body's core can be slightly warmed to increase wakefulness. The machine learning process (6) can monitor the success of the proximal and distal skin warming and make adjustments to duration and thermal gradient to optimize the settings for the most restful sleep.

The bedding system can control a white noise generator or other audio sources to create a more comfortable environment. Soft music can induce sleep and can be activated when a person first goes to bed or if the bedding system determines that the person is experiencing restlessness. White noise is known to improve sleep in noisy environments. For example, an audio sensor can detect a partner's snoring and activate white noise to lessen the disturbance caused by the snoring.

Biofeedback sensors can be used to help determine a person's sleep state. This can provide more accurate input to the sleep state process (7). A light sensor can also be used as input to the sleep state process. For example, if the sensor detects that a light is on in the room then the support and comfort attributes may not be adjusted until the light has been turned off. In another example, the sleep state process determines that the person is asleep but the light is still on. In this case the lighting control accessory is used to turn off the lights.

A person's location on the bed can be determined by the machine vision process (5) and an alert state can be initiated if the person is too close or overhanging the edge of the bed. The bedding system can then generate an audible alert to awaken the person. Alternatively, additional bladders can be located along the longitudinal length of the bed and these restraint bladders can be inflated to prevent a fall and gently force the person away from the edge of the bed.

The comfort and support engine (9) can control the adjustable mattress (16) via the comfort and adjustment system (17) to create a travelling wave of pressure across the adjustable mattress. The pressure wave can help induce sleep and reduce tossing and turning by creating a sensation of rocking or floating. For example, a sinusoidal wave of pressure can roll from one end of the adjustable mattress to the other. Various types of pressure waves can be sampled and selected via the user interface (8). For example, a person can select the amplitude of the wave, the period of the wave, the time between consecutive waves, the direction of the wave (lateral or longitudinal), the wave shape (sinusoidal, square, rectangular, triangular, adjustable rise and fall times for square, rectangular, or triangular waves), the wave pattern (pulsed, periodic, swept amplitude, random), the duration that the pressure wave will be activated, and the sleep states where the pressure wave will occur. The pressure wave can be activated when the machine learning process (6) detects a sleep state where additional comfort is desired.

The bedding system may also control an adjustable pillow. The construction and operation of the adjustable pillow can be similar to that of the adjustable mattress. An example of an adjustable pillow shown in FIG. 11a contains an adjustable comfort layer, an optional thermal pad layer, and/or an adjustable support layer. Alternatively, the adjustable pillow can contain an adjustable support layer, a comfort layer, and a surface layer. A pressure sensor can be embedded in the surface layer and a sensor electronics unit can provide pressure measurement data to the Control Processor Unit. FIG. 11b illustrates how the support layer of the adjustable pillow can be adjusted to provide optimum spinal alignment based on the person's sleeping position. The machine vision process (6) communicates body position (on back, on side) to the comfort and support engine (9) and the comfort and support engine appropriately adjusts the pillow height to optimize spinal alignment. The adjustment of the pillow support layer can be optimized during configuration of the bedding system or it can be adjusted to a surface pressure that provides the best comfort and support based on contact area and peak pressure. Alternatively, a pressure sensor is not included in the pillow and the optimum support adjustment is determined during the bedding system configuration.

The adjustable pillow can also include a thermal pad and temperature sensors that are controlled to improve comfort. For example, as the pillow can be warmed or cooled according to a person's personal preferences. The desired pillow temperature can be sampled and selected via the user interface. A desired temperature can be selected and different temperatures can be selected based on the person's sleep state. For example, a person may select a warmer pillow when in the "bed entry" or "restless" state and then a cooler pillow when in the "still" or "deep sleep" state. The control of the thermal pad can be provided in the same manner as the mattress thermal pads.

An example of a sleep state sequence and the corresponding bedding system and accessory comfort and support modes in FIG. 9 indicates how the bedding system can respond to changing sleep states and sleeping positions. The adjustable mattress and adjustable pillow can be set according to the sleep state determined by the machine vision process (5). Support and comfort modes can be selected to favor comfort or support or to optimize the balance between the two attributes. The thermal pads can be adjusted to appropriate sleep inducing or sleep inhibiting modes. A pressure wave can also be temporarily activated to induce sleep when a person enters the bed or when restlessness is detected. Other ambient conditions such as lighting, audio, and room temperature can also be adjusted for the sleep state determined by the sleep state process (7).

Figure 12:
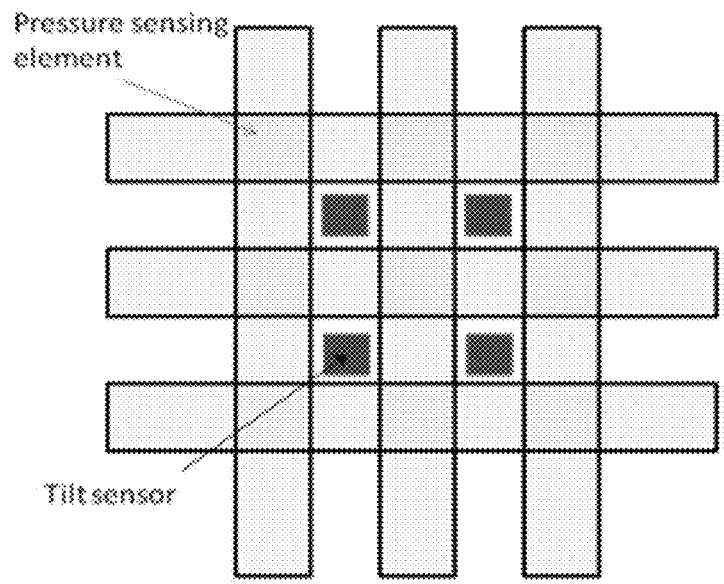
FIG. 12 is an example of a shape sensing array.

The bedding system can also incorporate shape sensing technology to ensure proper spinal alignment. An example of a shape sensor incorporated into the pressure sensor (11) in FIG. 12 includes additional tilt sensors inserted in between pressure sensing elements in the pressure sensor array. The number of tilt sensors incorporated in the sensor array is dependent of the size of the pressure sensing array. Tilt sensors can cover the entire sensing area or can be a more narrow array covering only the center line of the pressure sensor. For example, on a 26×64 pressure sensor, the tilt sensing array can be 1×64 to 10×64 in a center line configuration or 26×64 to cover the entire sensing area. In another example, the tilt sensing array only covers a body zone from the head to the hips in order to sense the shape of the neck and spine only. An example of a zone sized tilt sensing array can be 1 to 10 columns by 25 to 50 rows in a center line configuration. The tilt sensing array can be interleaved with the pressure sensing array by inserting tilt sensors in between the pressure sensing elements or by substituting tilt sensors in place of pressure sensing elements. Alternatively, the tilt sensing array can be an additional layer of the pressure sensor.

In another example, the tilt sensors can be incorporated into a form fitting garment with a column of tilt sensors running down the length of the spine. In another example, the tilt sensors can be incorporated into a pillow either as part of a pressure sensor layer or independently if the pillow has no integrated pressure sensor. The pillow tilt sensor array can be integrated into both sides of the pillow and can cover the entire surface of the pillow or a smaller area around the middle of the pillow. For example, a tilt sensor pillow array can be 1 to 10 columns by 10 to 25 rows with a separate array on both sides of the pillow.

Figure 13A:
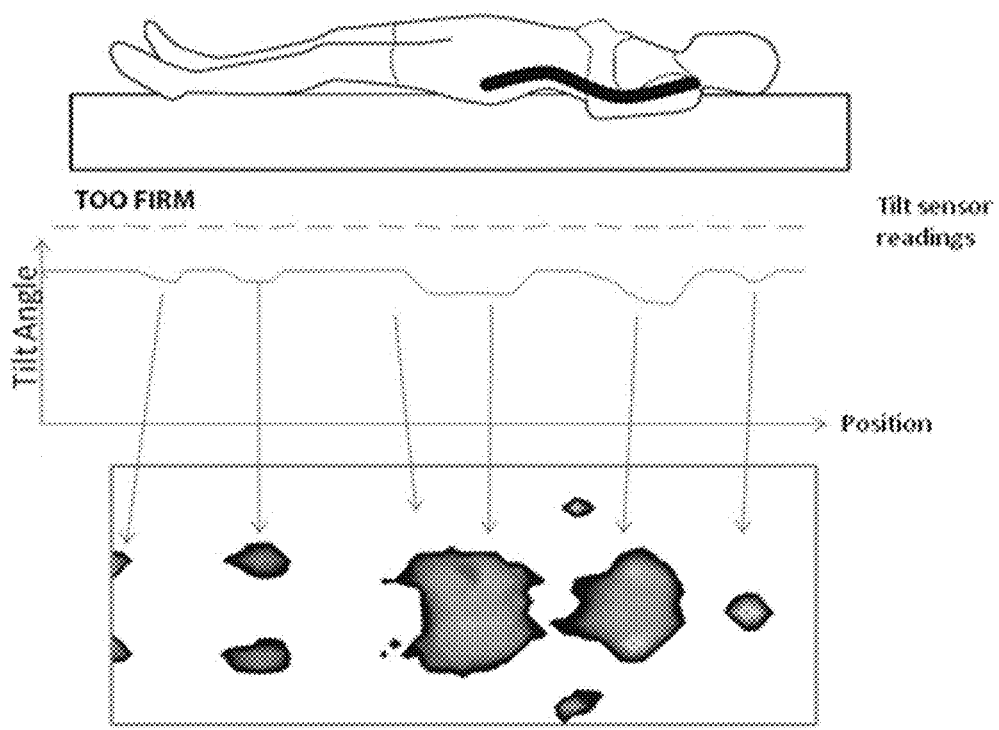
FIG. 13a illustrates tilt data related to spinal alignment for a back sleeper.
Figure 13B:
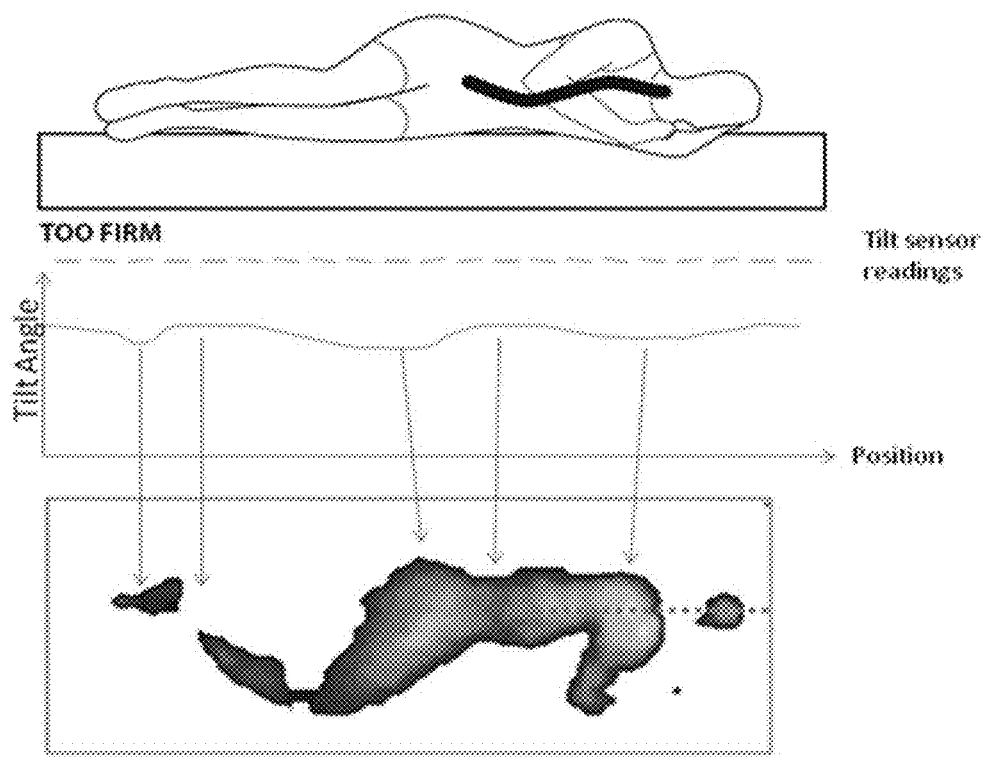
FIG. 13b illustrates tilt data related to spinal alignment for a side sleeper.

The shape sensor conforms to a person's body as it is enveloped by the mattress. FIG. 13a illustrates that the tilt sensor data can be used to construct a shape profile that can be used to optimize spinal alignment for a person sleeping on their back. FIG. 13b illustrates that the tilt sensor data can be used to construct a shape profile that can be used to optimize spinal alignment for a person sleeping on their side. A person's spinal alignment can be optimized through a manual or automatic process where the adjustable mattress firmness is swept from firm to soft and tilt profile data is analyzed by the machine vision process (5). Regions of the body that are immersed in the mattress but still flat will have tilt angles approaching zero. Body areas with deeper immersion in the mattress will have edges that have significant tilt angles. Tilt data can be interpreted in conjunction with pressure data. Regions of high pressure can have significant immersion relative to lower pressure areas. Pressure and tilt information can be correlated to create a 3 dimensional representation of the adjustable mattress surface.

Figure 14:
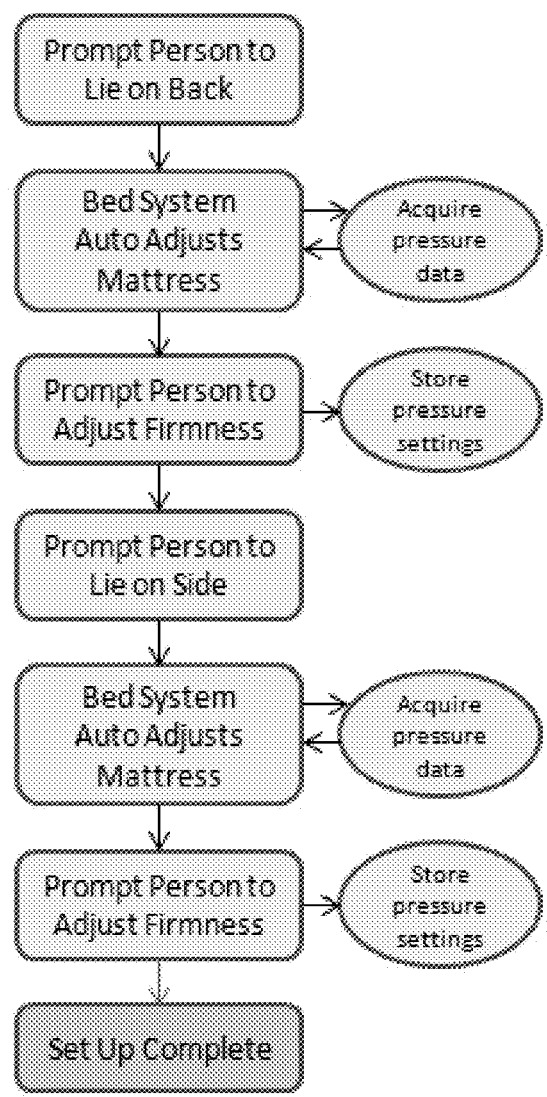
FIG. 14 is a flow diagram configuration process for a bedding system.

BEDDING SYSTEM CONFIGURATION. The user interface (8) can be used to set up the adjustable mattress either as an initial configuration when the bedding system is first purchased or as an 'on demand' process to recalibrate the mattress to changing conditions or preferences. An example of a bedding system configuration process in FIG. 14 prompts the person to first lie on their back. Pressure data is acquired from the sensor and the comfort and support engine attempts to optimize the support and comfort attributes based on the pressure data acquired as the adjustments are being made. The person is then prompted to make manual adjustments to allow them to adjust the mattress to their personal preferences. The person then hits done to store their preferred settings for back sleeping. The person is then prompted to turn on their side and the same process is repeated.

Once the initial bedding system set up is complete, the comfort and support engine (9) can automatically implement the back or side settings based on the sleeping position detected by the machine vision process (5). Further automatic adjustments of the support and comfort attributes can be performed in response to the machine learning process (6) or the sleep state process (7).

In another example, the bedding system configuration is followed with the assistance of a sleep specialist, either at home or in a retail setting, that assists in making the manual adjustments to ensure proper spinal alignment. In another example, the user manual can provide instructions on how two people can assist each other in verifying spinal alignment with configuring the bedding system.

In another example, the bedding system configuration includes the set up of accessory devices. For example, a person can select various accessory responses for each of the sleep states. A person can select that the zone around their feet is heated when they first enter the bed. A person can select that soft music or white noise is played when a restless sleep state is detected.

Figure 15:
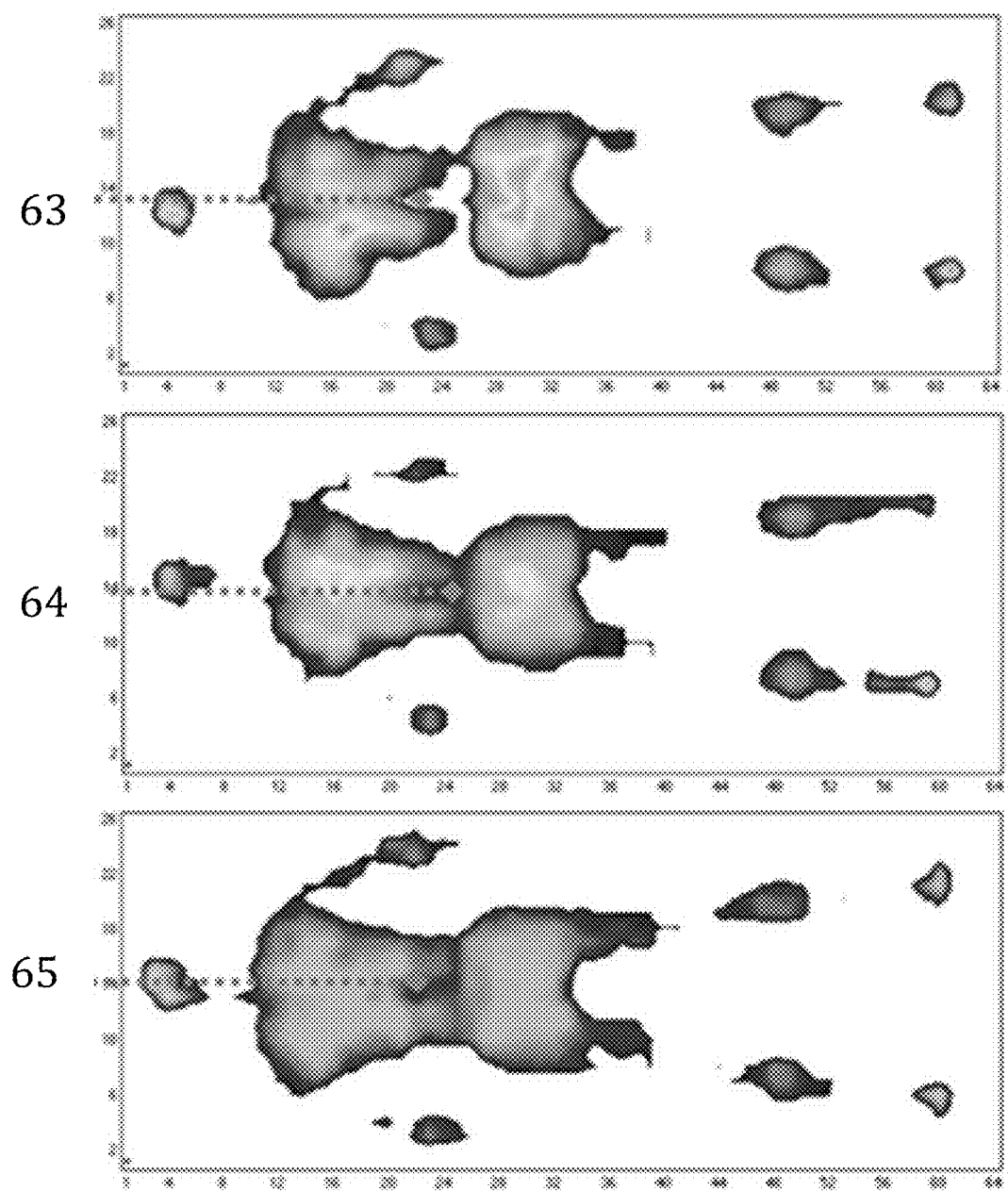
FIG. 15 is an example of pressure data for a mattress with decreasing firmness.

AUTOMATED ADJUSTMENT OF SUPPORT AND COMFORT ATTRIBUTES. The bedding system can make automated adjustments to optimize the support and comfort attributes in response to the pressure sensor data. For example, pressure peaks and contact area can be derived from the pressure data and this information is used to automatically adjust the firmness of the support and comfort layers. An example of pressure images that correspond to mattress firmness in FIG. 15 demonstrates the visible differences in pressure data. A pressure image from a firm mattress (63) has higher peak pressures and lower contact area. An area of no pressure can be observed in the small of the back. A pressure image from a medium firm mattress (64) has reduced peak pressures, greater contact area, and improved contact in the small of the back. A pressure image from a soft mattress (65) has the lowest pressure peaks, the most even pressure distribution, the greatest contact area, and the greatest contact in the small of the back.

Figure 16A:
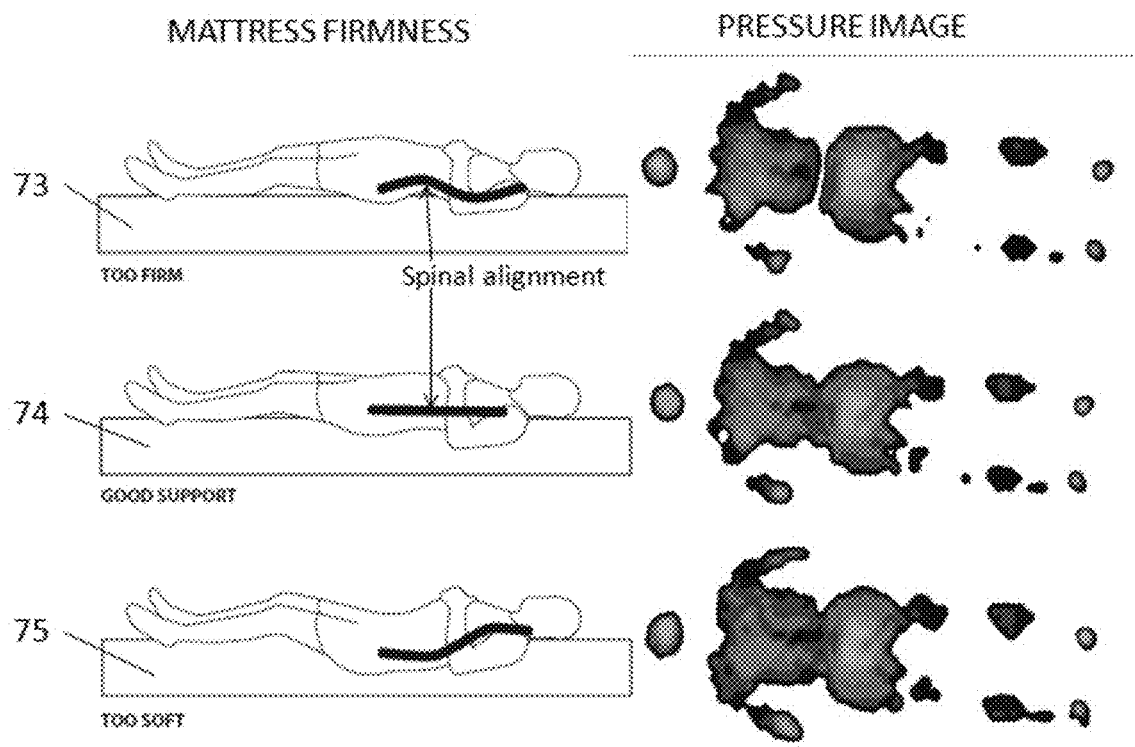
FIG. 16a illustrates spinal alignment for a back sleeper.

An example in FIG. 16a compares spinal alignment to mattress firmness and the corresponding pressure image. A too firm mattress (73) results in poor spinal alignment and the corresponding pressure image reveals lower contact area, higher peak pressures, and no contact in the small of the back. A mattress with good support (74) results in proper spinal alignment and the corresponding image shows lower peak pressures, a more even pressure distribution, increased contact area and good contact in the small of the back. A mattress that is too soft (75) also has poor spinal alignment but the pressure image has greater contact area and the most even pressure distribution. In this case the machine vision process (5) can compare the live pressure data to the optimal pressure data stored during the configuration of the bedding system and determine that the contact area for the too soft mattress (75) had exceeded the preferred contact area of the good support mattress.

Figure 16B:
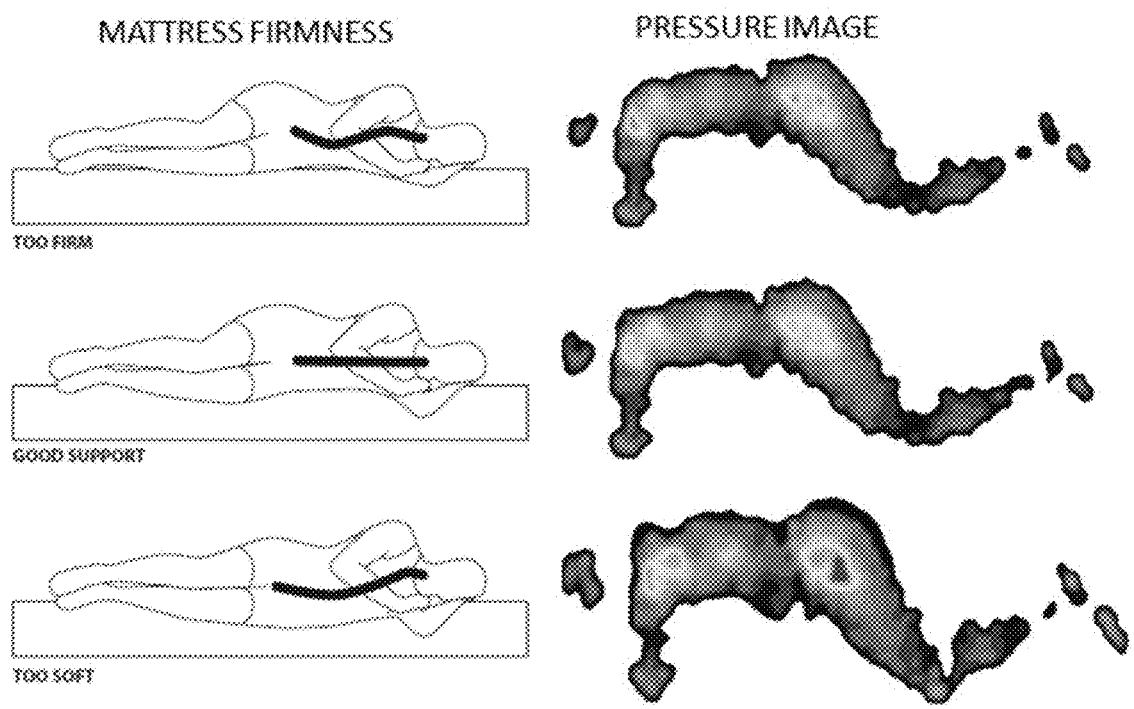
FIG. 16b illustrates spinal alignment for a slide sleeper.

FIG. 16b compares spinal alignment in the side sleeping position. As the mattress is adjusted from "too firm" to "good support," the peak pressures decreases and contact area increases. As the mattress is further adjusted to "too soft," the contact area continues to increase but peak pressures increase due to the person's body coming in contact with the hard base layer of the bedding system.

Figure 17:
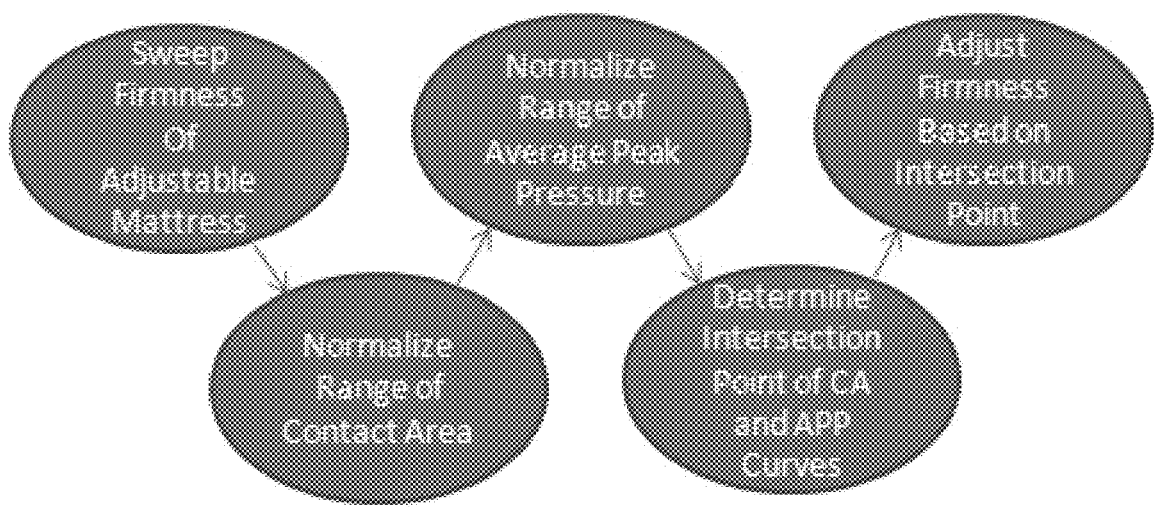
FIG. 17 is a flow diagram of a firmness optimization process.
Figure 18:
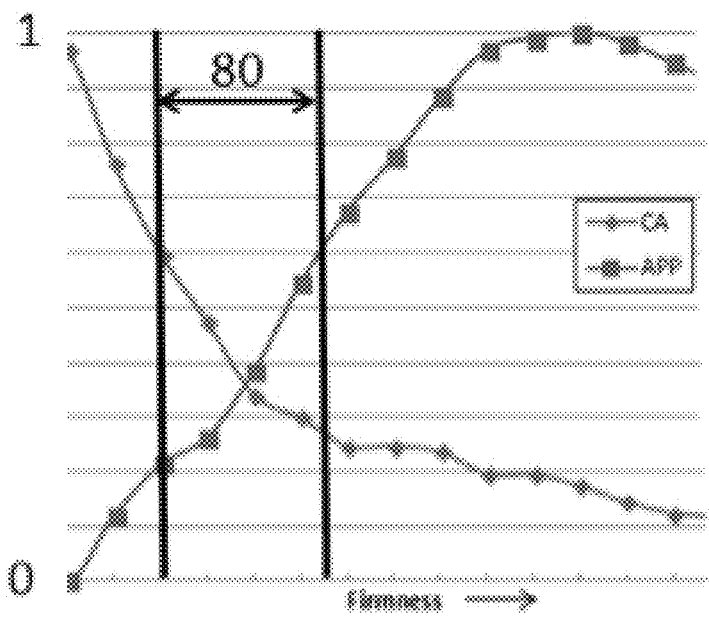
FIG. 18 is an example of a firmness optimization data derived from a pressure sensor dataset.

FIRMNESS OPTIMIZATION TECHNIQUE. An example of a technique that can be used to optimize the firmness of the support layer of the adjustable mattress is provided in FIG. 17. To begin, the comfort and support engine (9) instructs the comfort adjustment system (17) to inflate all the bladders in the adjustable mattress (16) to maximum firmness. The comfort and support engine then slowly deflates the bladders to sweep the firmness from maximum to minimum while the pressure mapping engine (4) records pressure data throughout the sweep. The pressure data is further processed into contact area and average peak pressure values that are subsequently normalized by translating the data range to values between 0 and 1. The resulting normalized contact area and average peak pressure datasets are processed to determine the mattress firmness where the two datasets intersect. A graphical example of the contact area and average peak pressure datasets in FIG. 18 demonstrates that as the firmness of the mattress is decreased the contact area increases and the average peak pressure decreases. The zone where the two datasets intersect can be considered the zone of optimum firmness.

Further adjustments based on other support and comfort attributes can be made within a range (80) of the optimum firmness point. For example, if the air bladder pressure is swept from 2 pounds per square inch (PSI) to 0.1 PSI and the optimum firmness was found to be at a bladder pressure of 0.7 PSI then firmness adjustments could be made between +/−5% to +/−25% of full scale, or preferably 10% full scale.

Figure 19:
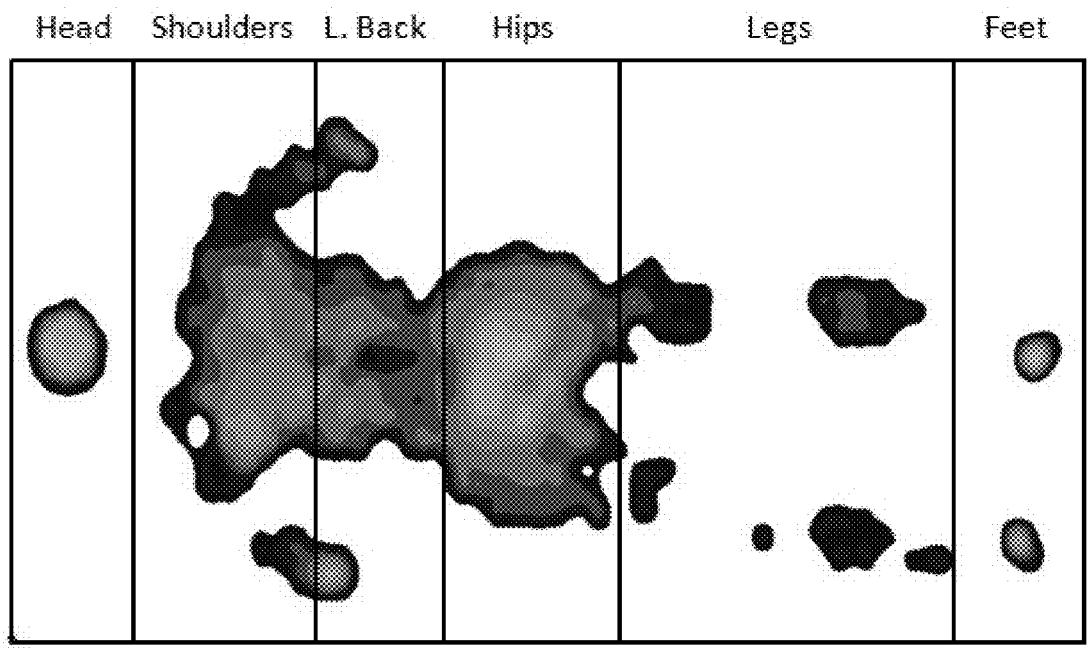
FIG. 19 is an example of a bedding system body zones.

BODY ZONES. Pressure measurements can also be subdivided into body zones or body areas to focus the automatic adjustment of the mattress firmness. For example, contact area could be calculated specifically in the lower back zone of a person's body, or peak pressures could be isolated to the shoulder and buttocks. The sensing area can be divided into 1 to 12 body zones, or preferably 6 zones isolating the head, shoulders, lower back, hips, legs and feet. An example of 6 body zones in FIG. 19 illustrates body zones of varying dimensions to align with the associated anatomical features.

In another example, the machine vision process (5) locates a person's body on the bedding system and automatically adjusts the body zones to align with the associated anatomical features.

Pressure data analysis within each body zone can be performed to evaluate the support and comfort attributes of the bedding system. For example, threshold pressure values may be used to determine a pressure distribution that compares the percentage of contact area that exceeds a high pressure threshold and the percentage of contact area that is below a low pressure threshold. Pressure distributions can be calculated for each body zone. Pressure distributions between body zones can also be compared. Optimum pressure distributions for each zone can be determined from the pressure data associated with the adjustable mattress settings stored during mattress configuration. Alternatively, the machine learning process (6) can select optimum pressure distributions based on pressure data that has resulted in the statistically determined best quality of sleep.

Figure 20:
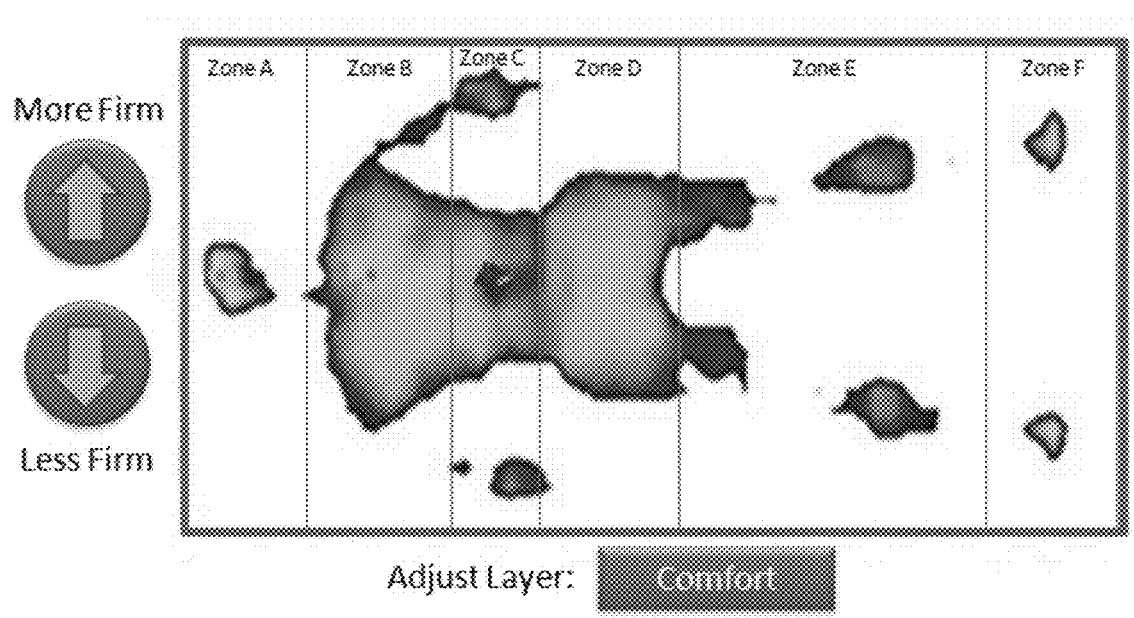
FIG. 20 is an example of a user interface for adjusting comfort and support.

In another example, the user interface (8) is used to allow a person to make manual adjustments to each zone in the adjustable mattress (16). An example of a zone adjusting user interface in FIG. 20 allows the user to manually adjust the mattress firmness in each body zone. The user interface allows the person to select either the support or comfort layers for adjustment. The preferred settings for each body zone are stored. The machine vision process (5) can determine the location of the body on the bedding system and communicate this to the comfort and support engine (9). The comfort and support engine can control the appropriate adjustable mattress bladders to align them with the body zones located with machine vision.

CNN Based Machine Vision Process

Figure 21:
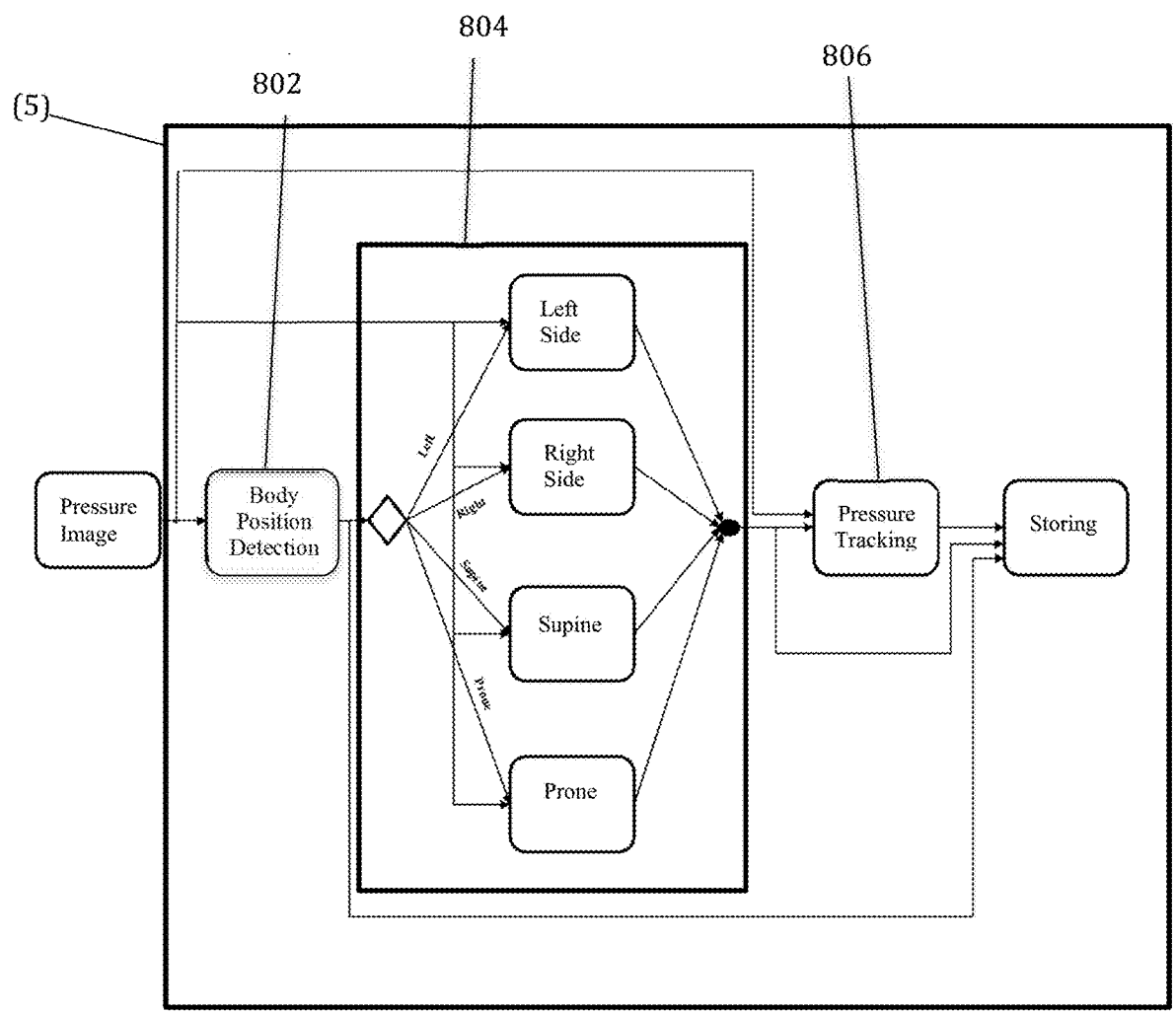
FIG. 21 illustrates an example machine vision process.

In some embodiments, the machine vision process (5) is based at least on a convolutional neural network. As one example illustrated in FIG. 21, the machine vision process (5) includes a body position detection module 802, a joint location determination module 804, and a pressure tracking module 806. The body position detection module 802 includes a trained convolutional neural network (CNN) that receives a pressure image and identifies a body position, for example, by classifying the pressure image into a predetermined body position classification (e.g., prone, supine, left side, right side, sitting on a bed, or sitting on an edge of a bed.) A pressure image may be pre-processed before being provided to the trained CNN for analysis. The pressure image can be a full body pressure image that includes pressure image of substantially full body or a partial body pressure image that includes pressure image of partial body.

The joint location determination module 804 may include at least one trained CNN that receives a pressure image and determines locations (e.g., coordinates on a pressure image) of one or more joints (e.g., head, left elbow, right elbow, hip, left knee, right knee, left ankle, or right ankle). A location of a joint is also referred herein as a joint location. For each predetermined body position classification, a corresponding CNN may be developed for determining joint locations. For example, in the illustrated example, four different CNNs are developed for determining joint locations for the prone, supine, left side, and right side body positions. In these embodiments, in addition to receiving a particular pressure image, the joint location determination module 804 receives the body position detected by the body position detection module 802. The joint location determination module 804 selects to use a particular trained CNN developed for the particular body position for determining joint locations. Additionally CNNs can be developed for determining joint locations for other body positions such as sitting on a bed, or sitting on an edge of the bed.

The pressure tracking module 806 tracks pressure accumulated at joints over time. The pressure tracking module 806 calculates pressure applied to one or more joints based on its input. In the illustrated example, the pressure tracking module 806 receives a pressure image, a body position detected by the body position detection module 802, and joint locations determined by the joint location determination module 804. Each of these modules are further described below.

Body Position Detection Module

Figure 22:
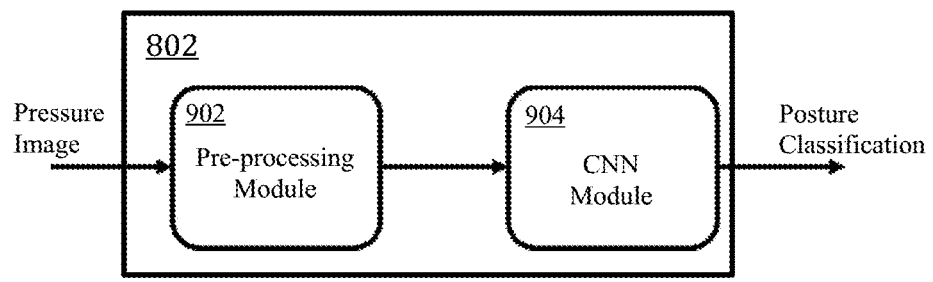
FIG. 22 illustrates an example body position detection module.

FIG. 22 illustrates an example body position detection module 802, according to one embodiment. The illustrated body position detection system 802 includes a convolutional neural network (CNN) module 904 designed to classify a pressure image into a predetermined body position classification. Example predetermined body position classifications include left side, right side, supine, and prone. The CNN module 904 includes a convolutional neural network developed for classifying pressure images into body position classifications. The convolutional neural network is trained using training data including, for example, pressure images that are labeled with body position labels. The body position labels can be tagged, for example, by users manually. In some embodiments, the body position labels are integers of different values representing different body positions and are included in a ground truth table associated with the pressure images. The pressure images are created by capturing different individuals lying in their comfortable body positions on mattresses. In some embodiments, the pressure images in the training data are processed such that the individuals' bodies are located in the centers of the mattresses.

When training a CNN, pressure images in a training set are passed as mini-batches to the CNN for multiple epochs to update weights and/or biases included in the CNN. In some embodiments, a CNN is trained using training data in multiple (e.g., 500) epochs. The mini-batch size can be selected according to a desired step-size. For example, a mini-batch size is set to include a few hundred samples.

A trained CNN receives an input (e.g., a pressure image), transforms it through a series of hidden layers, and outputs a body position classification. Each hidden layer includes neurons that each are fully connected to a local region of the input. A neuron includes learnable weights and biases. Neurons in a single layer may function independently and do not share connections.

In some embodiments, the trained convolutional neural network includes one or more of an input layer, a convolutional layer, a pooling layer, a fully connected layer, and an output layer that are arranged into a particular order. The trained convolutional neural network can include multiple convolutional layers, pooling layers, or fully connected layers. In some embodiments, each convolution layer is followed by a pooling layer. In some embodiments, a pooling layer is sandwiched by at least three convolutional layers where two sequential convolutional layers are followed by pooling layer which is followed by the third convolutional layer. The input layer receives an input pressure image that may be preprocessed.

A convolutional layer applies a convolution operation to its input and passes the result to the layer following the convolutional layer. A convolutional layer's parameters include a set of learnable filters (or kernels). During the forward pass, each filter is convolved across the width and height of an input pressure image, computes the dot product between the entries of the filter and the input image, and produces a 2-dimensional activation map of that filter. A trained CNN includes filters that each activate when detecting specific types of features at spatial positions in the input. A filter includes a set of weights and biases that convolved with its input. A size of a convolutional layer is defined as a number of filters in the layer, which can be determined as a product of the width, height, and depth of an input volume. In various embodiments, the C and F layers employ the rectify activation function to perform neuron-wise activations.

A pooling layer down-samples spatial dimensions of an input. That is, the pooling layer reduces the spatial size of the representation to reduce the amount of parameters and computation in the network. The pooling layer operates independently on every depth slice of an input and resizes it spatially, for example, using different types of non-linear functions. In some embodiments, the max-pooling function is employed. The max-pooling function partitions an input image into a set of non-overlapping regions (e.g., rectangles), and for each region, outputs the maximum.

A fully connected layer has full connections to all activations in the previous layer. That is, neurons in an F layer have connections to all activations in the previous layer. A size of an F layer defines a number of nodes in the layer.

To prevent overfitting, the CNN may include a dropout layer that removes individual nodes with a probability of (1-p) or keeping individual nodes with a probability p before training a particular layer with training data. Incoming and outgoing edges to a dropped-out node are also removed. The removed nodes are reinserted into the network with their original weights. Alternatively or additionally, the CNN may employ regularization techniques to prevent overfitting.

An output layer outputs a body position classification. The output layer employs a softmax activation function.

Figure 23A:
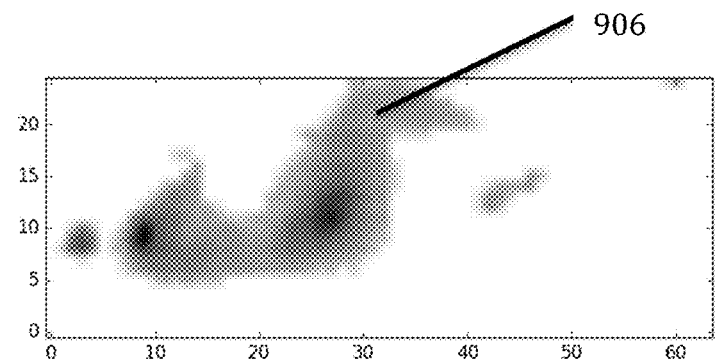
FIGS. 23A-B illustrate a pressure image before and after center-alignment is performed, respectively.
Figure 23B:
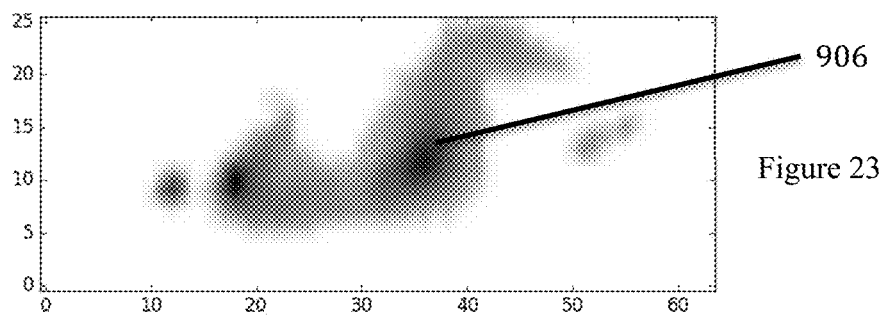

As illustrated, the body position detection module 802 includes a pre-processing module 902 for pre-processing pressure images before providing them to a trained CNN for analysis. The pre-processing module 902 performs one or more operations such as adjusting a size of an image, normalizing an image, removing a common background, and center-alignment. The pre-processing module 902 adjusts a size of the pressure images to a predetermined format. For example, the pre-processing module 902 applies zero-padding to images of which the size is less than a predetermined threshold. the pre-processing module 902 may normalize pressure images to a range (e.g. [0,1] or [−1,1]). The pre-processing module 902 determines a common background by calculating the mean of raw or normalized images in a training set. The pre-processing module 902 removes the calculated background from raw pressure images or normalized images. The pre-processing module 902 aligns the center of an individual's body to the center of a mattress to perform center-alignment. FIG. 23A-B illustrate a pressure image before and after center alignment. As illustrated in FIG. 23A, the individual's body 906 is not centered in a raw pressure image. After being center-aligned, the individuals' body 906 is centered in a processed image as illustrated in FIG. 23B. In this case, the center of the pressure image corresponds to the center of the mattress.

Joint Location Determination Module

Figure 24:
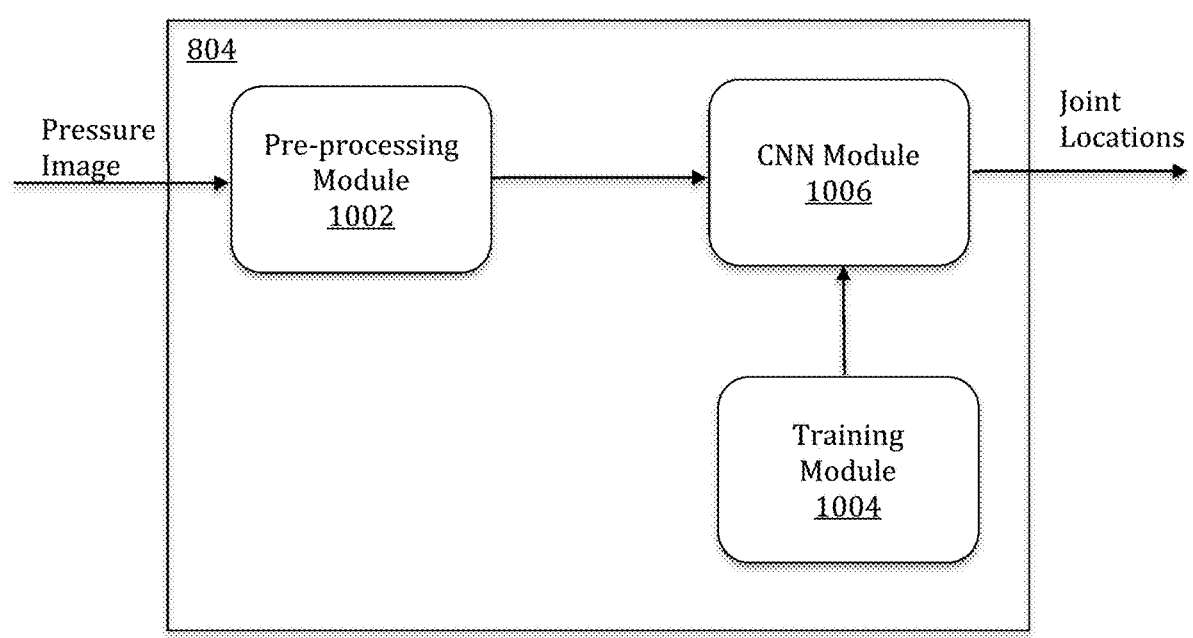
FIG. 24 illustrates an example joint location determination module.

FIG. 24 illustrates an example joint location determination module 804, according to one embodiment. The illustrated joint location determination module 804 detects coordinates of joints for a particular body position. The illustrated joint location determination module 804 includes an image pre-processing module 1002, a training module 1004, and a CNN module 1006. The CNN module 1006 includes a trained CNN that determines joint locations for one or more joints for a particular body position. In other embodiments, the trained CNN can detect joint coordinates for one or more joints for multiple different body positions. The joint coordinates can be 2D or 3D. 2D or 3D human body models (or avatars) can be created using the determined joint coordinates. One or more areas that are in contact with the supporting surface (e.g., a surface of the mattress) can be determined from the 2D or 3D human body models.

In some embodiments, the CNN module 1006 includes a CNN that includes one or more of an input layer, a convolutional layer, a pooling layer, a fully connected layer, and an output layer organized in a particular order. The CNN may include multiple convolutional layers, pooling layers, or fully connected layer. Details of the each layer have been described previously with respect to FIG. 22.

The input layer receives pressure images. The pressure images may be raw preprocessed as provided with respect to FIG. 22. The C and F layers each employ the Rectify activation function. The O layer employs a linear activation function.

The training module 1004 creates and provides training data to the CNN module 1006. To train a CNN for determining locations of joints from pressure images, the training module 1002 develops a ground truth table that includes joint locations (e.g., coordinates) of different individuals lying on mattresses in different body positions. The training data includes the pressure images and the ground truth table. The training module 1004 develops the ground truth table using one or more approaches as further described below. The ground truth table includes joint locations in 2D (i.e., x-y coordinates) or 3D (i.e., x-y-z coordinates). A CNN that is trained using 2D (or 3D) joint locations determines 2D (or 3D) joint locations.

In some embodiments, the training module 1004 provides pressure images to users for marking one or more joints. The users are prompted to mark the one or more joints on each pressure image in a predetermined order. The locations (e.g., coordinates in a pressure image) of the marked joints are stored in the ground truth table.

In some embodiments, the training module 1004 creates the ground truth table using color detection techniques. While individuals are lying on mattresses, in addition to capturing pressure images, pictures are taken concurrently. One or more cameras that are used to capture images are calibrated such that the captured images can be aligned. For example, a participant with markers attached at known positions is used to calibrate one or more cameras and to obtain a relative location of each camera. The pictures and the pressure images that are captured at substantially the same time are paired and aligned. Participants wear clothing where one or more of the joints are color marked differently from the rest of the bodies. The captured pictures are processed by image processing techniques such as the Canny edge detector technique to remove background. The processed images include only participants lying down on a bed frame and the bed frame. The processed images are converted to a color space (e.g., RGB, YUV, HSL), and coordinates of the markers (i.e. the marked joints) are located based on their color code in the color space. The identified locations (e.g., coordinates in pressure images) are stored in the ground truth table.

In some embodiments, the training module 1004 uses motion capture (mo-cap) data. Optical and/or non-optical systems can be used to capture the mo-cap data. Optical systems utilize information captured from image sensors (e.g., infrared cameras) to triangulate the 3D position of an individual. For example, optical passive systems track retroreflective markers, for example, by infrared cameras. A light source near a camera illuminates the reflective markers. The camera's threshold is adjusted such that highly reflective objects such as the markers are sampled and the rest such as skin and clothing is disregarded. Optical active systems track LED markers or alternative powered markers, for example, by cameras. Because the markers can emit light, the markers can be visually differentiated by switching the marker on or off or changing the properties of the emitted light. In marker-less systems, cameras record an individual without any markers. Computer algorithms analyze captured pictures thereby to identify and track human bodies over time.

Example non-optical systems include inertial motion capture systems, mechanical motion capture systems, and magnetic motion capture systems. An inertial motion capture system uses inertial sensors, biomechanical models, and/or sensor fusion algorithms for motion capture. Inertial sensors (e.g., an accelerometer, a gyroscope, and a magnetometer) are attached to an individual's body. The individual's movement can be tracked from data generated by the inertial sensors. A mechanical motion capture system tracks body movement, for example, directly using sensors such as strain gauges and potentiometers that are triggered to generate signals by any body motion. The sensors can be built into an exoskeleton. A magnetic motion capture system measures relative magnetic flux at each marker point and at a transmission point, and calculates positions and orientation of the marker points using the measured relative magnetic flux.

In some embodiments, the training module 1004 further applies data augmentation techniques to increase the number of training pressure sensor images thereby to overcome overfitting problems. For example, pressure images are flipped, rotated by an angle (0-180 degrees), or rotated by an angle and then flipped, before being provided to train the CNN. The training module 1004 updates parameters of a trained CNN periodically. For example, the training module 1004 defines an objective function for the CNN that is based on mean squared errors between actual and determined joint locations. The training module 1004 updates the parameters for each mini-batch, for example, by using an adaptive graduate update.

The training module 1004 employs an objective function when training the CNN. For example, the training module 1004 minimizes the objective function with respect to the errors between actual and determined joint locations. In some embodiments, the objective function defines Euclidean loss on joint locations according to Equation (1):

$$L = \Sigma_{k=1}^{K} \|J_k^p - J_k^a\|^2 \qquad (1),$$

where K denotes the number of joints, $J_k^p$ denotes a determined joint location for the joint k, and $J_k^a$ denotes an actual location for the joint k.

Figure 25A:
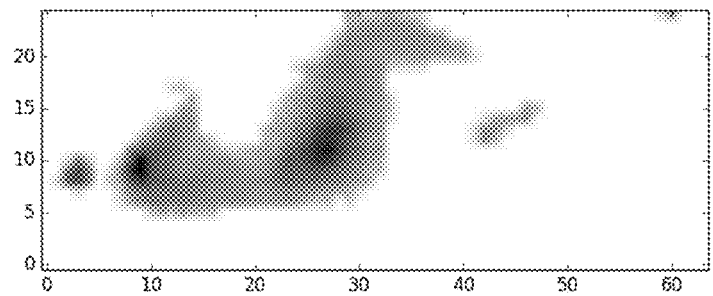
FIGS. 25A through D illustrate a pressure image before and after zero-padding, center-alignment, and joint location detection is performed, respectively.
Figure 25B:
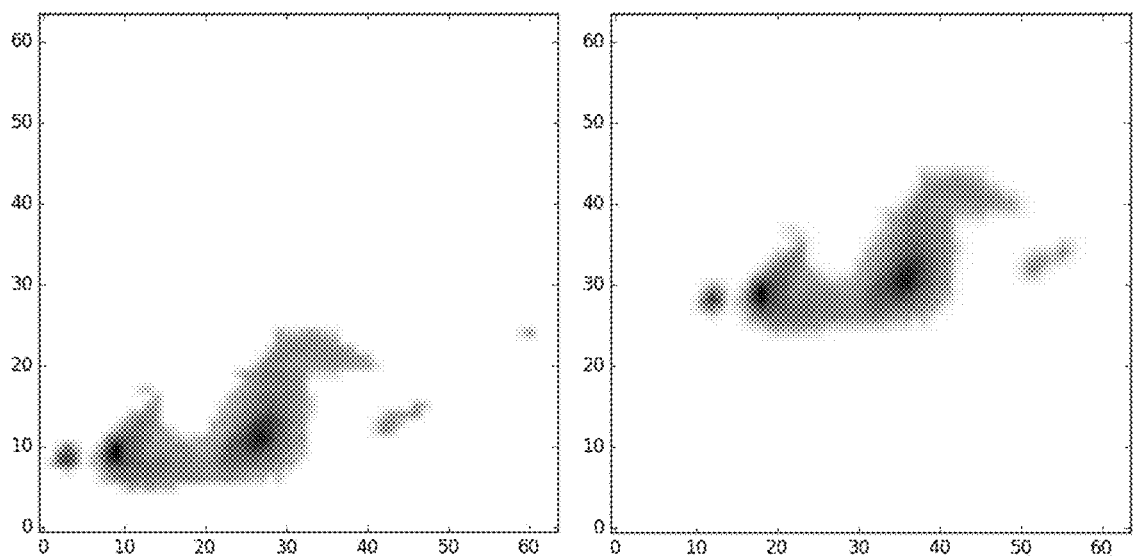
Figure 25C:
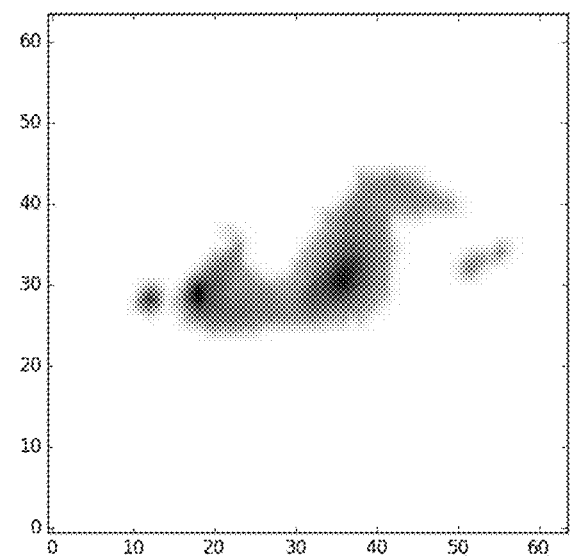

The pre-processing module 1002 processes pressure image before providing them to the CNN module 1006 for analysis. The pre-processing module 1002 re-formats received pressure images into a predetermined format. The pre-processing module 902 performs one or more operations such as adjusting a size of an image, center-alignment, normalizing an image, and removing a common background. Details of pre-processing have been provided above with respect to FIG. 22 and are omitted herein. The pre-processing module 1002 may apply the same processing to the ground truth table created by the training module 1004. The coordinates are normalized to be in a predetermined range. FIG. 25A illustrates an original pressure image. The original pressure image is processed by applying zero-padding to its top edge, and the resulting image is illustrated in FIG. 25B. The zero-padded pressure image is further center aligned, and the resulting image is illustrated in FIG. 25C.

Figure 25D:
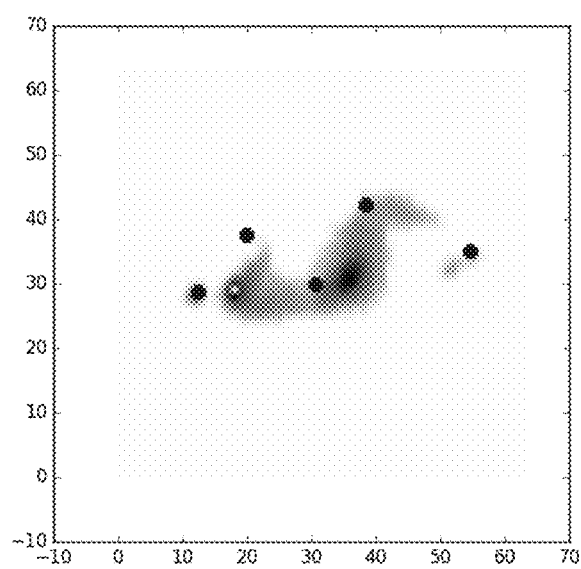

The CNN module 1006 receives a pressure image and outputs determined joint locations of one or more body joints in the received pressure image. In particular, the CNN module 1006 includes a trained CNN that detects and analyzes features in the received pressure image, and determines locations of one or more joints based on the features. For example, as illustrated in FIG. 25D, the 5 dots are placed onto the processed pressure image at the determined locations of 5 joints (head, left elbow, hip, left knee and left ankle) for a left side body position.

The CNN module 1006 may consider joint dependencies when determining locations of one or more joints. In some embodiments, the CNN module 1006 includes a kinematic model to estimate joint locations. The kinematic model receives pose parameters from the CNN such as from an output of a fully connected layer. The pose parameters include rotations and displacements of each joint relative to a root joint (e.g., hip). The kinematic layer considers relations between multiple joints.

In some embodiments, the CNN module 1006 includes an auto-encoder to refine joint locations that are determined by the trained CNN. The auto-encoder considers dependencies between joints. For example, the auto-encoder observes relationships between joint locations of different joints. The auto-encoder may be developed, for example, using the ground truth table such that the auto-encoder considers the dependencies between the joints stored in the ground truth table.

In some embodiments, the CNN module 1006 may further change the objective function to consider joint dependencies. For example, the objective function according to Equation (1) does not consider joint dependencies. The CNN module 1006 uses a different loss function that exploits joint dependencies. For example, a loss function that considers losses between joints, bones, and the loss obtained from all pairs of joints is used. The loss obtained from all pairs of joints can be determined according to Equation (1). Positions of bones can be determined according to Equation (2). Losses between actual and identified positions of bones can be determined according to Equation (3):

$$B_k = J_{parent(k)} - J_k \qquad (2),$$

$$L = \Sigma_{k=1}^{K} \|B_k^p - B_k^a\|^2 \qquad (3),$$

where $J_{parent(k)}$ is a parent joint of a joint $J_k$, K is a total number of bones, $B_k^p$ is the determined bone position for bone k, and $B_k^a$ is the actual bone position coordinate for bone k. For two neighboring joints, the joint that is closer to the root joint is the parent of the other joint. The loss for any pair of the joints is defined according to Equation (4):

$$L = \Sigma_{(u,v) \in P} \|\Delta J_{u,v}^p - \Delta J_{u,v}^a\|^2 \qquad (4)$$

$$\Delta J_{u,v} = \Sigma_{m=1}^{M-1} B_{I(m)} \qquad (5),$$

where $\Delta J_{u,v}$ is the relative joint position between the joints $J_u$ and $J_v$, M is number of joints between the joints $J_u$ and $J_v$ and $B_{I(m)}$ is a bone in the path between these two joints.

Pressure Tracking Module

Figure 26:
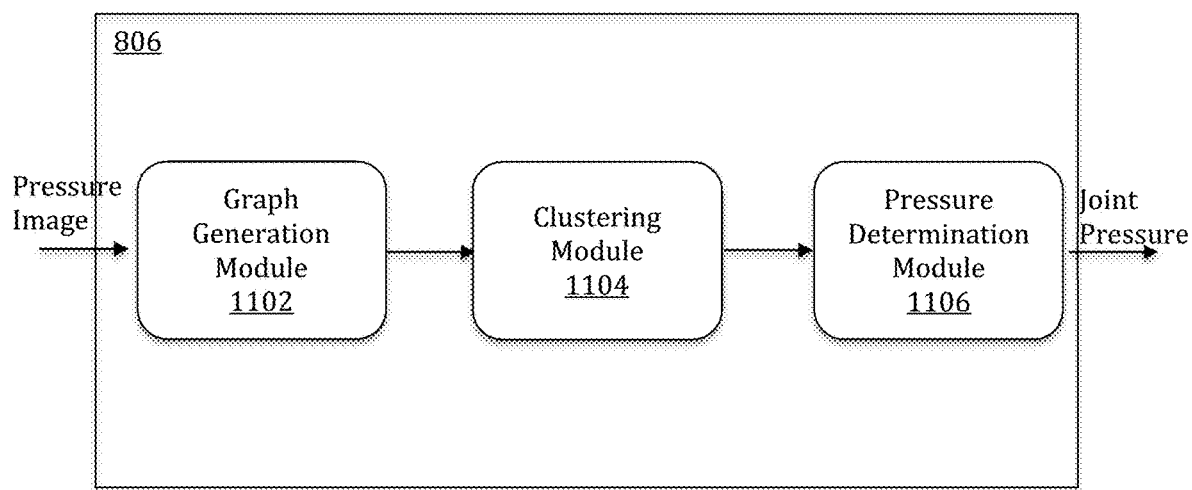
FIG. 26 illustrates an example joint pressure tracking module.

FIG. 26 illustrates an example pressure tracking module 806, according to one embodiment. The pressure tracking module 806 receives pressure images, determines pressure applied to one or more joints from the pressure images, and tracks pressure accumulated on the joints over time. In various embodiments, the pressure tracking module 806 compares the determined pressure value at a joint to a pressure threshold. In some embodiments, the pressure tracking module 806 alerts a user if the determined pressure value at the joint is over the pressure threshold. In other embodiments, the pressure tracking module 806 alerts a user if the determined pressure value at the joint is over the pressure threshold for a time period. Users can therefore adjust the supporting surface to prevent tissue damage. As illustrated, the pressure tracking module 806 includes a graph generation module 1102, a clustering module 1104, and a pressure determination module 1106.

For an input pressure image, the graph generation module 1102 generates a pressure graph that includes nodes connected by edges. An array of vectors corresponding to locations in the pressure image is generated. For example, a vector $A_i$ includes values $(x_i, y_i, p_i)$ where $x_i$ and $y_i$ are x-y coordinates of a corresponding location of a pressure image, and $p_i$ is a pressure measurement at the location. The values $x_i, y_i$ and $p_i$ can be normalized to the range of (0,1). In some embodiments, the normalized $p_i$ are multiplied by a predetermined value (e.g., 0.1).

For a vector $A_i$, a set of K nearest neighboring vectors $n(A_i)$ is identified, for example, by calculating their respective Euclidean distance from the vector Ai. A nearest neighboring vector has a distance that is less than a threshold. The graph generation module 1102 creates a graph where each vector Ai corresponds to a node in the graph. A node is connected by edges to its nearest neighboring nodes. An edge connects a node to one of the nearest neighboring nodes. The graph generation module 1102 may further refine the graph by assigning weights to the edges. The weights can be calculated according to Equation (6):

$$w_i = \frac{|n(A_i) \cap n(A_j)|}{|n(A_i) \cup n(A_j)|}. \tag{6}$$

The clustering module 1104 partitions the graph thereby to cluster regions of a pressure image based on pressure measurements and their locations. In particular, the clustering module 1104 partitions the graph according to a modularity of the partition. The modularity of a partition is a scalar value between −1 and 1 that measures the density of edges inside partitions as compared to edges between partitions and can be calculated according to Equation (7):

$$Q = \frac{1}{2} \sum_{i,j} \left[ A_{ij} - \frac{k_i k_j}{2m} \right] \delta(c_i, c_j), \tag{7}$$

where $A_{ij}$ is the weight of the edge between i and j, $k_i$ is the sum of the weights attached to node i, $c_i$ is the partition to which node i is assigned. $\delta(u, v)$ is 1 if u=v and 0 otherwise and $m=\frac{1}{2}\Sigma_{ij}A_{ij}$.

For each node in the graph, the clustering module 1140 assigns a different partition. Then, for each node i, the clustering module 1140 considers the neighbors j of i, and evaluates the gain modularity that would take place by removing i from its partition and by placing it in the partition of j. The node i is then placed in the partition for which this gain is maximum.

Figure 27A:
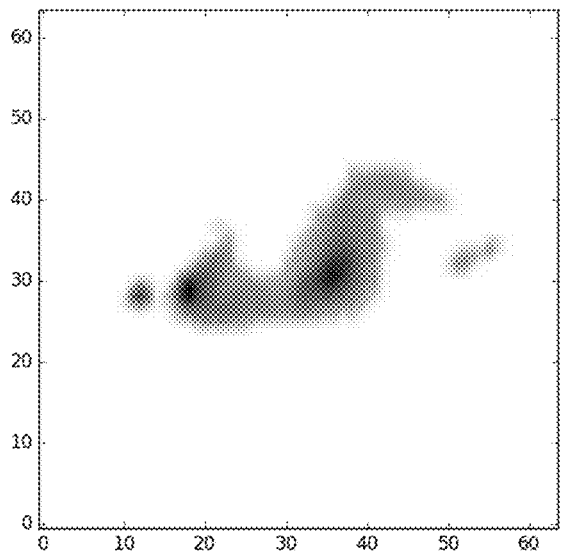
FIGS. 27A-B illustrate a pressure image before and after clustering is performed, respectively.
Figure 27B:
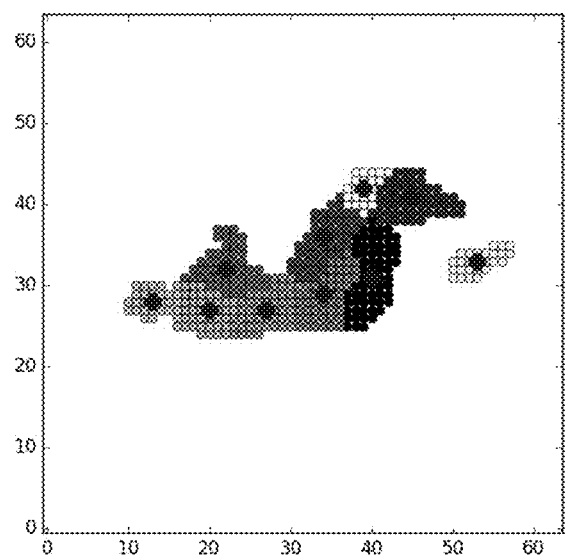

In some embodiments, the clustering module 1104 partitions the same graph multiple times (e.g., 100 times) into possible partitions. From the possible partitions, the clustering module 1104 selects a particular partition that has the lowest number of clusters and highest partitioning quality. The partition quality is measured using modularity of the partition. Each cluster includes one or more nodes that correspond to a pressure measurement at a particular location in a pressure image. The pressure image illustrated in FIG. 27A is processed into the clusters illustrated in FIG. 27B. The dots represent the centers of the clusters.

The pressure determination module 1106 calculates pressure applied onto the identified joints. For a particular joint, the pressure determination module 1106 identifies the closest cluster that is the cluster of which the center is closest the joint among the clusters. That is, the center of the cluster has the least Euclidean distance from the joint. The pressure determination module 1106 determines that the pressure applied to the joint equals to the pressure at the center of the closest cluster. For a particular cluster, the pressure determination module 1106 averages the pressure measurements and assigns the averaged pressure measurements to the center of the cluster.

In other embodiments, the pressure tracking module 806 determines pressure accumulated at a particular joint by calculating pressure of the nearest neighboring locations. In particular, the determined joint locations are mapped onto a pressure image and the pressure measurements of the K nearest neighboring locations is calculated as the pressure applied to the joint.

The CNN based machine vision process can be applied to other supporting surfaces such as seat surfaces to adjust comfort and support attributes and/or to provide pressure relief. For example, the machine vision process can detect a body position in the seat. The machine vision process can also detect anatomical features such as ischial tuberosity, trochanter, coccyx, etc. Based on the detected body position and/or anatomical features, the seat surface can be adjusted.

What is claimed is:

1. A method for adjusting a bedding system, comprising:
   receiving a two-dimensional pressure image of a sleeper on a bedding system while the sleeper is sleeping on the bedding system; and
   applying a machine vision process to analyze the pressure image, comprising:
      selecting, by a first machine learned model, a position classification for a body position of the sleeper, the position classification selected from a set of predetermined position classifications, wherein the first machine learned model comprises a convolutional neural network, the convolutional neural network trained using training data comprising pressure images tagged with body position labels, and wherein the convolutional neural network comprises at least three convolution layers each of which is coupled to a pooling layer,
      determining, by a second machine learned model, one or more joint locations of the sleeper, the one or more joints selected from a set of predetermined joints, and
      determining pressure values at the one or more joints using the pressure image and the one or more joint locations.

2. The method of claim 1, further comprising:
   adjusting a comfort and/or support of the bedding system based at least in part on the position classification.

3. The method of claim 1, wherein applying the machine vision process further comprises:
   tracking the pressure values at the one or more joints over time.

4. The method of claim 1, further comprising:
   selecting the second machine learned model from a set of machine learned models for determining joint locations based on the position classification, each of the set of machine learned models corresponding to a predetermined position classification.

5. The method of claim 1, wherein the set of predetermined position classifications includes a leftside-sleeping classification, a rightside-sleeping classification, a prone-sleeping classification, and a supine-sleeping classification.

6. A method for adjusting a bedding system, comprising:
   receiving a two-dimensional pressure image of a sleeper on a bedding system while the sleeper is sleeping on the bedding system; and
   applying a machine vision process to analyze the pressure image, comprising:
      pre-processing the pressure image before providing the pressure image to a first machine learned model, wherein the pre-processing comprises center-aligning the pressure image by aligning a center of a body on the pressure image to a center of the pressure image
      selecting, by the first machine learned model, a position classification for a body position of the sleeper, the position classification selected from a set of predetermined position classifications,
      determining, by a second machine learned model, one or more joint locations of the sleeper, the one or more joints selected from a set of predetermined joints, and
      determining pressure values at the one or more joints using the pressure image and the one or more joint locations.

7. The method of claim 6, wherein the pre-processing further comprises normalizing the center-aligned pressure image.

8. The method of claim 6, wherein the pre-processing further comprises resizing the pressure image to a predetermined size responsive to determining that the size of the pressure image is less than a predetermined threshold.

9. The method of claim 1, wherein a joint location comprises at least one of a 2-dimensional coordinate and a 3-dimensional coordinate.

10. The method of claim 1, wherein the second machine learned model comprises a convolutional neural network.

11. The method of claim 10, further comprising training the convolutional neural network using training data comprising training pressure images and a ground truth table including identified joint locations of one or more joints for the training pressure images.

12. The method of claim 11, wherein the identified joint locations are identified by manual labeling, color detection, or motion detection.

13. The method of claim 11, wherein training the convolutional neural network further comprising training the convolutional neural network according to an objective function to minimize errors between actual joint locations and the determined joint locations.

14. The method of claim 13, wherein the objective function defines relationships between joints.

15. The method of claim 10, wherein the second machine learned model further comprises at least one of a kinematic model and an auto-encoder coupled to the convolutional neural network, the kinematic model or the auto-encoder defining relationships among joints and to refine the joint locations determined by the convolutional neural network.

16. A method for adjusting a bedding system, comprising:
receiving a two-dimensional pressure image of a sleeper on a bedding system while the sleeper is sleeping on the bedding system; and
applying a machine vision process to analyze the pressure image, comprising:
selecting, by a first machine learned model, a position classification for a body position of the sleeper, the position classification selected from a set of predetermined position classifications,
determining, by a second machine learned model, one or more joint locations of the sleeper, the one or more joints selected from a set of predetermined joints, and
determining pressure values at the one or more joints using the pressure image and the one or more joint locations, wherein determining pressure values at the one or more joints using the pressure image and the one or more joint locations comprises:
clustering locations of the pressure image into multiple clusters; and
for each joint location, identifying a corresponding cluster having a center closest to the joint location and averaging the pressure measures in the corresponding cluster to calculate the pressure value at the joint location.

17. The method of claim 16, wherein clustering locations into multiple cluster comprises:
generating a pressure graph including nodes connected by edges using the pressure image, each node corresponding to one of the locations and each edge connecting one of the nodes to one of the closest neighboring nodes to the node; and
partitioning the nodes into multiple clusters, each cluster including a set of the nodes.

* * * * *